US009865129B2

(12) United States Patent
Donavan et al.

(10) Patent No.: US 9,865,129 B2
(45) Date of Patent: Jan. 9, 2018

(54) GAMING SYSTEM AND METHOD PROVIDING A PLURALITY OF DIFFERENT PLAYER-SELECTABLE WAGER ALTERNATIVES WHEN A CREDIT BALANCE IS LESS THAN A DESIGNATED WAGER AMOUNT AND GREATER THAN OR EQUAL TO A LOWEST ELIGIBLE CREDIT BALANCE

(71) Applicant: IGT, Las Vegas, NV (US)

(72) Inventors: Arthur A. Donavan, Reno, NV (US); Christian D. Gerchak, Sparks, NV (US); Stephen M. Abbamonte, Reno, NV (US); Kenneth J. McAll, Reno, NV (US); Christopher P. Strader, Reno, NV (US); Christopher W. Ginac, Reno, NV (US); Timothy C. Hare, Reno, NV (US); Amanda M. Tremblay, Reno, NV (US); Dave W. Mueller, Reno, NV (US); Xin Yu, Reno, NV (US); Robert W. Maddox, Sparks, NV (US); Gianpaulo M. Sorreta, Sparks, NV (US)

(73) Assignee: IGT, Las Vegas, NV (US)

( * ) Notice: Subject to any disclaimer, the term of this patent is extended or adjusted under 35 U.S.C. 154(b) by 0 days.

(21) Appl. No.: 15/052,459

(22) Filed: Feb. 24, 2016

(65) Prior Publication Data

US 2016/0171832 A1 Jun. 16, 2016

Related U.S. Application Data

(63) Continuation of application No. 14/028,958, filed on Sep. 17, 2013, now Pat. No. 9,293,005.

(Continued)

(51) Int. Cl.
*A63F 13/00* (2014.01)
*G07F 17/32* (2006.01)
(Continued)

(52) U.S. Cl.
CPC ...... *G07F 17/3244* (2013.01); *G07F 17/3209* (2013.01); *G07F 17/34* (2013.01); *G07F 17/42* (2013.01)

(58) Field of Classification Search
CPC ............. G07F 17/3244; G07F 17/3248; G07F 17/3255; G07F 17/3269
(Continued)

(56) References Cited

U.S. PATENT DOCUMENTS

| | | | |
|---|---|---|---|
| 5,505,461 | A | 4/1996 | Bell et al. |
| 5,531,448 | A | 7/1996 | Moody |

(Continued)

FOREIGN PATENT DOCUMENTS

| | | |
|---|---|---|
| GB | 2 101 380 | 1/1983 |
| WO | WO 02/21369 | 3/2002 |

OTHER PUBLICATIONS

"CDS to 'Give 'Em What They Want' Unveiling Its New Tokenizer Technology at WGCE, The Free Library, available at http://www.thefreelibrary.com/CDS+to+%60%60Give+%60Em+What+They+Want"+Unveiling+Its+New+Tokenizer...-a066181681, Oct. 18, 2000 (4 pages).

(Continued)

*Primary Examiner* — James S McClellan
(74) *Attorney, Agent, or Firm* — Neal, Gerber & Eisenberg LLP

(57) ABSTRACT

Various embodiments of the present disclosure provide a gaming system and method providing a plurality of different player-selectable wager alternatives if a credit balance of a player is less than a designated wager amount (such as a cost (Continued)

to cover a play of a wagering game or a maximum wager amount for the play of the wagering game) and greater than or equal to a lowest eligible credit balance (such as 1 credit). Generally, selecting one of the different wager alternatives when the player's remaining credit balance is less than the designated wager amount and greater than or equal to the lowest eligible wager amount enables the player to utilize the player's remaining credit balance (or any suitable portion thereof) in a manner that is different than, separate from, and in addition to wagering on one or more plays of the wagering game.

29 Claims, 21 Drawing Sheets

Related U.S. Application Data

(60) Provisional application No. 61/863,200, filed on Aug. 7, 2013.

(51) Int. Cl.
*G07F 17/34* (2006.01)
*G07F 17/42* (2006.01)

(58) Field of Classification Search
USPC .............................................. 463/20, 25, 29
See application file for complete search history.

(56) References Cited

U.S. PATENT DOCUMENTS 5,620,182 A 4/1997 Rossides
5,630,753 A 5/1997 Fuchs
5,732,950 A 3/1998 Moody
5,823,873 A 10/1998 Moody
5,947,821 A 9/1999 Stone
5,954,335 A 9/1999 Moody
5,967,896 A 10/1999 Jorasch et al.
5,976,016 A 11/1999 Moody et al.
6,007,066 A 12/1999 Moody
6,014,594 A 1/2000 Heidel et al.
6,098,985 A 8/2000 Moody
6,120,378 A 9/2000 Moody et al.
6,126,541 A 10/2000 Fuchs
6,173,955 B1 1/2001 Perrie et al.
6,253,119 B1 6/2001 Dabrowski
6,264,556 B1 7/2001 Izawa et al.
6,308,953 B1 10/2001 Nagano
6,311,978 B1 11/2001 Moody
6,312,333 B1 11/2001 Acres
6,375,187 B1 4/2002 Baerlocher
6,379,248 B1 4/2002 Jorasch et al.
6,454,651 B1 9/2002 Yoseloff
6,494,785 B1 12/2002 Gerrard et al.
6,506,118 B1 1/2003 Baerlocher et al.
6,514,141 B1 2/2003 Kaminkow et al.
6,517,074 B1 2/2003 Moody et al.
6,561,898 B2 5/2003 Moody
6,568,680 B1 5/2003 Moody et al.
6,569,015 B1 5/2003 Baerlocher et al.
6,599,192 B1 7/2003 Baerlocher et al.
6,632,141 B2 10/2003 Webb et al.
6,648,754 B2 11/2003 Baerlocher et al.
6,652,377 B1 11/2003 Moody
6,692,355 B2 2/2004 Baerlocher et al.
6,719,632 B2 4/2004 Palmer et al.
6,722,981 B2 4/2004 Kaminkow et al.
6,722,982 B2 4/2004 Kaminkow et al.
6,758,750 B2 7/2004 Baerlocher et al.
6,786,820 B2 9/2004 Gerrard et al.
6,790,141 B2 9/2004 Muir
6,793,579 B2 9/2004 Baerlocher et al.
6,796,905 B2 9/2004 Baerlocher et al.
6,808,452 B2 10/2004 Baerlocher et al.
6,808,454 B2 10/2004 Gerrard et al.
6,811,483 B1 11/2004 Webb et al.
6,848,995 B1 2/2005 Walker et al.
6,852,030 B2 2/2005 Baerlocher et al.
6,857,961 B2 2/2005 Soltys et al.
6,869,357 B2 3/2005 Adams et al.
6,890,256 B2 5/2005 Walker et al.
6,890,257 B2 5/2005 Baerlocher
6,899,623 B2 5/2005 Baerlocher
6,939,224 B2 9/2005 Palmer et al.
6,942,566 B2 9/2005 Baerlocher et al.
6,942,567 B2 9/2005 Baerlocher et al.
6,955,356 B2 10/2005 Moody
6,960,132 B2 11/2005 Baerlocher et al.
6,964,418 B2 11/2005 Moody
6,966,833 B2 11/2005 Kaminkow et al.
6,971,953 B2 12/2005 Gerrard et al.
6,984,175 B2 1/2006 Nguyen et al.
6,991,544 B2 1/2006 Soltys et al.
7,001,273 B2 2/2006 Baerlocher
7,004,466 B2 2/2006 Gauselmann
7,025,674 B2 4/2006 Adams et al.
7,040,984 B2 5/2006 Mead
7,063,618 B2 6/2006 Walker et al.
7,094,149 B2 8/2006 Walker et al.
7,137,628 B2 11/2006 Moody
7,156,397 B2 1/2007 Moody et al.
7,156,736 B2 1/2007 Adams et al.
7,160,186 B2 1/2007 Cuddy et al.
7,192,349 B2 3/2007 Baerlocher et al.
7,222,857 B2 5/2007 Moody
7,222,858 B2 5/2007 Moody
7,235,010 B2 6/2007 Baerlocher
7,250,001 B2 7/2007 Baerlocher et al.
7,252,590 B2 8/2007 Palmer et al.
7,264,545 B2 9/2007 Maya et al.
7,270,604 B2 9/2007 Gerrard et al.
7,326,114 B2 2/2008 Webb et al.
7,329,182 B2 2/2008 Adams et al.
7,331,864 B2 2/2008 Baerlocher
7,361,087 B2 4/2008 Baerlocher et al.
7,364,507 B2 4/2008 Baerlocher et al.
7,404,762 B2 7/2008 Moody
7,407,435 B2 8/2008 Baerlocher et al.
7,416,485 B2 8/2008 Walker et al.
7,419,162 B2 9/2008 Lancaster et al.
7,431,644 B2 10/2008 Moody
7,470,184 B2 12/2008 Baerlocher et al.
7,494,413 B2 2/2009 Singer et al.
7,566,272 B2 7/2009 Gerrard et al.
7,572,184 B2 8/2009 Baerlocher et al.
7,601,057 B2 10/2009 Kaminkow
7,601,061 B2 10/2009 Jackson
7,607,978 B2 10/2009 Palmer et al.
7,625,282 B2 12/2009 Baerlocher et al.
7,658,673 B2 2/2010 Baerlocher et al.
7,658,674 B2 2/2010 Walker et al.
7,722,451 B2 5/2010 Hughs-Baird et al.
7,722,456 B2 5/2010 Walker et al.
7,722,463 B2 5/2010 Maya et al.
7,731,582 B2 6/2010 Randall et al.
7,749,068 B2 7/2010 Cuddy et al.
7,758,417 B2 7/2010 Jorasch et al.
7,771,271 B2 8/2010 Walker et al.
7,783,534 B2 8/2010 Armstrong et al.
7,785,195 B2 8/2010 Palmer et al.
7,794,316 B2 9/2010 Palmer et al.
7,874,911 B2 1/2011 Walker et al.
7,878,901 B2 2/2011 Walker et al.
7,887,412 B2 2/2011 Baerlocher
7,901,287 B2 3/2011 Simms et al.
7,905,772 B2 3/2011 Baerlocher et al.
7,905,775 B2 3/2011 Walker et al.
7,963,842 B2 6/2011 Ruymann
7,976,382 B2 7/2011 Benbrahim
8,038,524 B2 10/2011 Bryant et al.
8,801,519 B2 8/2014 Singer et al.
9,171,421 B2 10/2015 Walker et al.

(56) References Cited

U.S. PATENT DOCUMENTS

| | | | |
|---|---|---|---|
| 2001/0051540 | A1 | 12/2001 | Hindman et al. |
| 2002/0032049 | A1 | 3/2002 | Walker et al. |
| 2002/0147040 | A1 | 10/2002 | Walker et al. |
| 2002/0177479 | A1 | 11/2002 | Walker et al. |
| 2003/0013521 | A1 | 1/2003 | Cole et al. |
| 2003/0040360 | A1 | 2/2003 | Kaminkow |
| 2003/0078093 | A1 | 4/2003 | Simms |
| 2003/0083126 | A1 | 5/2003 | Paulsen |
| 2003/0104862 | A1 | 6/2003 | Acres |
| 2003/0130024 | A1 | 7/2003 | Darby |
| 2003/0162584 | A1 | 8/2003 | Hughs-Baird et al. |
| 2003/0162588 | A1 | 8/2003 | Brosnan et al. |
| 2003/0216169 | A1 | 11/2003 | Walker et al. |
| 2004/0010556 | A1 | 1/2004 | Kawakita et al. |
| 2004/0106444 | A1 | 6/2004 | Cuddy et al. |
| 2004/0106454 | A1 | 6/2004 | Walker et al. |
| 2004/0110554 | A1 | 6/2004 | Bromfield |
| 2004/0162128 | A1 | 8/2004 | Baerlocher et al. |
| 2004/0195773 | A1 | 10/2004 | Masci et al. |
| 2005/0020342 | A1 | 1/2005 | Palmer et al. |
| 2005/0054413 | A1 | 3/2005 | Randall et al. |
| 2005/0130729 | A1 | 6/2005 | Baerlocher et al. |
| 2005/0170884 | A1 | 8/2005 | Okada |
| 2005/0187012 | A1 | 8/2005 | Walker et al. |
| 2006/0035696 | A1 | 2/2006 | Walker et al. |
| 2006/0089195 | A1 | 4/2006 | Walker et al. |
| 2006/0121983 | A1 | 6/2006 | Walker et al. |
| 2006/0135238 | A1 | 6/2006 | Lancaster et al. |
| 2006/0154722 | A1 | 7/2006 | Walker et al. |
| 2006/0172791 | A1 | 8/2006 | Wolf |
| 2006/0211470 | A1* | 9/2006 | Walker .................... G07F 17/32 463/16 |
| 2006/0211486 | A1 | 9/2006 | Walker et al. |
| 2006/0252527 | A1 | 11/2006 | Walker et al. |
| 2007/0045957 | A1 | 3/2007 | Blair, Jr. |
| 2007/0087818 | A1 | 4/2007 | Walker et al. |
| 2007/0135206 | A1 | 6/2007 | Inamura |
| 2007/0155482 | A1 | 7/2007 | Walker et al. |
| 2007/0155483 | A1 | 7/2007 | Walker et al. |
| 2007/0155484 | A1 | 7/2007 | Walker et al. |
| 2007/0173318 | A1 | 7/2007 | Abbott |
| 2008/0020815 | A1 | 1/2008 | Lancaster et al. |
| 2008/0070674 | A1 | 3/2008 | Lancaster et al. |
| 2008/0076496 | A1 | 3/2008 | Baerlocher et al. |
| 2008/0076500 | A1 | 3/2008 | Lancaster et al. |
| 2008/0182655 | A1 | 7/2008 | DeWaal et al. |
| 2008/0274789 | A1 | 11/2008 | Singer et al. |
| 2008/0300051 | A1 | 12/2008 | Walker et al. |
| 2009/0005144 | A1 | 1/2009 | Moody |
| 2009/0088252 | A1 | 4/2009 | Nicely et al. |
| 2009/0124344 | A1 | 5/2009 | Mitchell et al. |
| 2009/0131159 | A1 | 5/2009 | Englman et al. |
| 2010/0120502 | A1 | 5/2010 | Oberberger |
| 2010/0248821 | A1 | 9/2010 | Jorasch et al. |
| 2010/0252996 | A1 | 10/2010 | Aguilera |
| 2011/0130188 | A1 | 6/2011 | Walker et al. |
| 2011/0246332 | A1 | 10/2011 | Alcodray et al. |
| 2011/0287832 | A1 | 11/2011 | Low et al. |

OTHER PUBLICATIONS

International Search Report and Written Opinion of the International Searching Authority for PCT Appl. No. PCT/US12/54637, dated Dec. 20, 2012 (13 pages).

Screenshots of “Multiplier” game and instructions on how to play “Multiplier” game, printed on Jan. 16, 2012 from https://platform.rgsgames.com/game.do?nscode=CGC&currencycode=FPY&denomamount=1.0&uniqueid=freeplay&minbet=1.0&softwareid=200-0057-002&language=en&skincode=GM, last updated Jun. 29, 2004 (4 pages).

* cited by examiner 1116,1118

GAMING SYSTEM AND METHOD PROVIDING A PLURALITY OF DIFFERENT PLAYER-SELECTABLE WAGER ALTERNATIVES WHEN A CREDIT BALANCE IS LESS THAN A DESIGNATED WAGER AMOUNT AND GREATER THAN OR EQUAL TO A LOWEST ELIGIBLE CREDIT BALANCE

PRIORITY CLAIM

This application is a continuation of, and claims priority to and the benefit of, U.S. patent application Ser. No. 14/028,958, which was filed on Sep. 17, 2013, which claims priority to and the benefit of U.S. Provisional Patent Application No. 61/863,200, which was filed on Aug. 7, 2013 and is now expired, the entire contents of each of which are incorporated herein by reference.

COPYRIGHT NOTICE

A portion of the disclosure of this patent document contains or may contain material that is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

For many years, electronic wagering gaming machines (EGMs) included coin slots and required players to deposit coins or tokens into the coin slots to play the wagering game(s) on the EGMs. When a player won or desired to cash out of one of these EGMs, the EGM would pay out in coins or tokens. In the past ten to fifteen years, EGMs accepting and paying out in coins or tokens have been and continue to be phased out and replaced with EGMs that accept paper currency (such as bills) and redeemable tickets or vouchers having monetary value and that pay out in redeemable tickets or vouchers (that are redeemable by the player for currency).

A large percentage of currently employed EGMs require players to deposit paper currency (such as or bills) of different amounts (such as $1.00, $5.00, $10.00, $20.00, $50.00, and $100.00) and/or one or more redeemable tickets having monetary value into these EGMs to play one or more wagering games on these EGMs. A player will typically insert one or more bills or redeemable tickets into an EGM. The EGM will receive each bill or redeemable ticket, read each bill or redeemable ticket, and display the player's credit balance in the credit meter of the EGM. Initially, the credit meter displays the player's credit balance as an amount equal to the total value of the bills and redeemable tickets deposited by the player. The credit meter will display the player's credit balance either as an amount or quantity of credits (such as 1000 credits) or as an amount of currency (such as $10.00). Certain EGMs enable the player to select how the credit meter displays the player's credit balance (i.e., either as an amount of currency or as an amount or quantity of credits). When the credit meter displays the player's credit balance as an amount or quantity of credits, the credit meter typically displays the credits in the denomination of the EGM or in the selected denomination that the EGM is currently employing. For example, if the EGM is set at or is employing a $0.25 denomination and the player has deposited $20.00, the credit meter displays 80 credits.

Certain EGMs are set at a specific denomination, such as $0.01, $0.02, $0.05, $0.25, or $1.00. Other EGMs enable the player to select a denomination from a plurality (such as four) of predetermined different denominations, such as $0.01, $0.05, $0.25, and $1.00. EGMs typically accept or enable the player to make wagers in multiples of the denomination that the EGM is set at or that is selected by the player. An EGM thus enables a player to use the player's credit balance displayed in the credit meter to make wagers on the EGM. During play, a wager amount of each wager is deducted from the player's credit balance displayed by the credit meter, and each winning amount is added to the player's credit balance displayed by the credit meter.

As mentioned above, an EGM typically enables a player to wager multiples of the set or employed denomination for each play of the wagering game. Typically, an EGM requires a player to place at least a minimum wager having a minimum wager amount and at most a maximum wager having a maximum wager amount. For example, many $0.25 denomination slot machines each include one payline, and each of those slot machines enables a player to wager one, two, or three credits (i.e., $0.25, $0.50, or $0.75) on that payline for each play of that wagering or slot game on that slot machine. That is, in these example slot machines, the minimum wager (a 1 credit wager on the payline) has a minimum wager amount of 1 credit (or $0.25), and the maximum wager (a 3 credit wager on the payline) has a maximum wager amount of 3 credits (or $0.75). In another example, many $0.25 slot machines each include five paylines, and each of those slot machines enables a player to wager one, two, three, four, or five credits ($0.25, $0.50, $0.75, $1.00, or $1.25) on each of the five paylines for each play of the wagering or slot game on that slot machine. That is, in these example slot machines, the minimum wager (a 1 credit wager on one of the paylines) has a minimum wager amount of 1 credit (or $0.25), and the maximum wager (a 5 credit wager on each of the five paylines) has a maximum wager amount of 25 credits (or $6.25).

One widely known and implemented strategy for playing a multi-line or multiple payline slot machine is for a player to place the minimum allowable wager amount on each payline of that slot machine. The amount required to place such a wager is typically referred to as the "cost to cover" a play of the wagering game. This enables the player to win an award if any winning symbol or winning symbol combination occurs on any of the paylines. For example, in the embodiments of the five payline $0.25 slot machines described above, a player implementing this strategy would wager 1 credit (the minimum allowable wager amount per payline) on each of the five paylines, resulting in a total wager amount of 5 credits (or $1.25). Thus, the cost to cover is 5 credits (or $1.25) in this example.

Another widely known and implemented strategy for playing a slot machine is for a player to place the maximum wager, as described above. For example, in the embodiments of the five payline $0.25 slot machines described above, a player implementing this strategy would place the maximum wager by wagering 5 credits (the maximum allowable wager amount per payline) on each of the five paylines, resulting in a total wager amount of 25 credits (or $6.25), which is equal to the maximum wager amount. EGMs typically have a MAX BET button that enables a player to quickly and easily place the maximum wager having the maximum wager amount for a play of the wagering game or games on those EGMs.

EGMs, including slot machines, typically have paytables that provide a higher average expected payback percentage when a player places the maximum wager. One manner in which gaming machines provide such a higher average expected payback percentage when a player places the maximum wager is by employing one or more higher award multiples when the player places the maximum wager.

One example of a slot machine paytable that employs higher award multiples when a player places the maximum wager is provided below. A slot machine employing this example slot machine paytable enables a player to wager on a single payline. The maximum wager allowed by this example slot machine is 3 credits on the single payline; that is, the maximum wager amount is 3 credits (e.g., $3.00 if the slot machine is a $1.00 denomination slot machine). In this example slot machine paytable, the value of the top award in terms of the award multiplier varies relative to the wager. That is, for wagers of 1 credit or 2 credits on the single payline (i.e., wagers less than the maximum wager of 3 credits in this example), the top award is 800 times the wager: 800 credits for the 1 credit wager and 1,600 credits for the 2 credit wager. On the other hand, for the maximum wager of 3 credits on the single payline, the top award is 1,000 times the wager, or 3,000 credits.

| | Wager Amount | | |
|---|---|---|---|
| | 1 Credit | 2 Credits | 3 Credits |
| Winning Symbol Combination | Award (credits) | | |
| Three Double Diamond Symbols | 800 | 1,600 | 3,000 |
| Three Sevens | 80 | 160 | 240 |
| Three Triple Bars | 40 | 80 | 120 |
| Three Double Bars | 25 | 50 | 75 |
| Three Single Bars or Cherries | 10 | 20 | 30 |
| Three of Any Bar or Two Cherries | 5 | 10 | 15 |
| Any 1 Cherry | 2 | 4 | 6 |

One example of a draw poker paytable that employs higher award multiples when a player places the maximum wager is provided below. A draw poker EGM employing this example draw poker paytable enables a player to wager on a single hand of draw poker. The maximum wager allowed by this example draw poker EGM is 5 credits on the single hand of draw poker; that is, the maximum wager amount is 5 credits (e.g., the $5.00 if the draw poker EGM is a $1.00 denomination draw poker EGM). In this example draw poker paytable, the value of the top award in terms of the award multiplier varies relative to the wager. That is, for wagers of 1 credit, 2 credits, 3 credits, or 4 credits on the single hand (i.e., wagers less than the maximum wager of 5 credits in this example), the top award is 250 times the wager: 250 credits for the 1 credit wager, 500 credits for the 2 credit wager, 750 credits for the 3 credit wager, and 1,000 credits for the 4 credit wager. On the other hand, for the maximum wager of 5 credits on the single hand, the top award is 800 times the wager, or 4,000 credits.

| | Wager Amount | | | | |
|---|---|---|---|---|---|
| | 1 Credit | 2 Credits | 3 Credits | 4 Credits | 5 Credits |
| Winning Hand | Award (credits) | | | | |
| Royal Flush | 250 | 500 | 750 | 1,000 | 4,000 |
| Straight Flush | 50 | 100 | 150 | 200 | 250 |
| Four of a Kind | 25 | 50 | 75 | 100 | 125 |
| Full House | 8 | 16 | 24 | 32 | 40 |
| Flush | 5 | 10 | 15 | 20 | 25 |

-continued

| | Wager Amount | | | | |
|---|---|---|---|---|---|
| | 1 Credit | 2 Credits | 3 Credits | 4 Credits | 5 Credits |
| Winning Hand | Award (credits) | | | | |
| Straight Flush | 4 | 8 | 12 | 16 | 20 |
| Three of a Kind | 3 | 6 | 9 | 12 | 15 |
| Two Pair | 2 | 4 | 6 | 8 | 10 |
| Jacks or Better | 1 | 2 | 3 | 4 | 5 |

In other EGMs, if the player places the maximum wager, the player is eligible to win the top award, a jackpot award, or a large progressive award. Each of these awards is not typically winnable by the player if the player does not place the maximum wager (i.e., if the player wagers an amount less than the maximum wager amount) for that play of the wagering game.

One example paytable for a slot machine that enables a player to win one or more awards only if the player places the maximum wager is provided below. This example slot machine enables a player to place a wager of either 1 credit or 2 credits on a single payline. Thus, for a $1.00 denomination slot machine, the minimum wager is $1.00 and the maximum wager is $2.00. In this example, the awards associated with the various number seven symbols are only available to be won by the player if the player places the maximum wager of two credits ($2.00 in this example). It should be appreciated that, in this embodiment, the placement of the maximum wager does not increase the values of the other awards available to be won.

| | Wager Amount | |
|---|---|---|
| | 1 Credit | 2 Credits |
| Winning Symbol Combination | Award (Credits) | |
| Three Sizzling Sevens | — | 500 |
| Three Red Sevens | — | 150 |
| Three Mixed Sevens | — | 100 |
| Three Triple Bars | 60 | 60 |
| Three Double Bars | 40 | 40 |
| Three Single Bars | 20 | 20 |
| Three Any Bars | 10 | 10 |
| Three Blanks | 2 | 2 |

In other EGMs, if the player places the maximum wager, the player is eligible to win or play a bonus game if a bonus triggering symbol combination occurs, and if the player does not place the maximum wager, the player is not eligible to win or play a bonus game even if the bonus triggering symbol combination occurs.

One example slot machine paytable for a slot machine that illustrates this is provided below. This example slot machine enables a player to place a wager on one or more of five paylines. The maximum allowable wager per payline in this example slot machine is 1 credit. Thus, for this example slot machine, the maximum wager is one credit on each of the five paylines; that is, the maximum wager amount is 5 credits (e.g., $5.00 if this example slot machine is a $1.00 denomination slot machine). In this example slot machine paytable, the player can win entry into a bonus game only if the player places the maximum wager (i.e., wagers one credit on each of the five paylines) and if three Spin symbols appear along one of the five paylines. That is, in this example slot machine paytable, the player cannot win entry into the bonus game if the player does not place the maximum wager (i.e., wagers an amount less than the maximum wager amount).

| Winning Symbol Combination | Wager Amount: 1 to 4 Credits | Wager Amount: Max Bet Award (for the winning symbol combination along a wagered-on payline) |
|---|---|---|
| Three Wheel of Fortune Symbols | 2,000 | Progressive Jackpot |
| Three Spin symbols | — | Play Bonus Game |
| Any combination of three Wheel of Fortune and Double Diamond Symbols | 800 | 800 |
| Three Sevens | 80 | 80 |
| Three Triple Bars | 40 | 40 |
| Three Double Bars | 25 | 25 |
| Three Triple Cherries | 10 | 10 |
| Three Single Bars | 10 | 10 |
| Three Any Bars | 5 | 5 |
| Any Two Triple Cherries | 5 | 5 |
| Any One Triple Cherry | 2 | 2 |

Internet or online wagering games typically offer the same betting structures, though there are certain differences. For instance, internet or online wagering games do not accept bills. To fund internet or online wagering games, a player must deposit funds by establishing an account associated with the online wagering games and transferring money into that account, such via a credit card, an electronic funds transfer, or any other suitable manner.

Another difference is that many internet or online cash casinos offering such wagering games offer a much wider range of wager amounts than their land-based counterparts. For example, the ratio between a minimum payline wager and a maximum payline wager for a slot machine in a land-based casino typically ranges from 2× to 5×, while the same ratio in internet or online cash casinos tends to be much higher, typically ranging from 50× to 500×. For this reason, online casinos are typically less likely to offer paytables having higher average expected payback percentages for maximum wagers.

In some implementations, a player's entire account balance is available for wagering on any particular internet or online wagering game. In other implementations, a player does not play an internet or online wagering game with the player's entire account balance at once. Rather, when the player desires to play an internet or online wagering game, the player transfers money from the player's account to that wagering game. The transferred money is displayed in the credit meter for that wagering game, and is available to be wagered on a play of that wagering game.

One significant problem for players of slot games on land based EGMs as well as for players of internet or online slot games often arises when the player's credit balance in the credit meter is below or falls below a designated level such that the player cannot place the minimum allowable wager amount on each of the paylines. In this situation, the player's credit balance does not meet the "cost to cover" for a play of the wagering game. When this occurs, the player generally has three choices or options.

The first choice or option is for the player to add more money to the EGM such that the player's credit balance equals or exceeds the cost to cover, thereby enabling the player to place the minimum allowable wager amount on each payline for a play of the slot game.

The second choice or option is for the player to cash out and obtain the player's remaining money on the EGM. In EGMs that employ redeemable tickets to pay players, the EGM prints a ticket and the player later has to redeem this ticket. Specifically, after the player obtains the ticket, the player has to: (a) locate a ticket redeeming kiosk or casino cashier, (b) wait in line, and (c) wait while the ticket redeeming kiosk or the cashier makes change and provides it to the player. Since the value of the ticket will typically be low in this situation due to the player's credit balance being less than the cost to cover, many players consider this process a waste of time and a bother.

In fact, many players choose not to go through the hassle of redeeming these tickets. In 2011 alone, about 25% of seventy audited properties reported unclaimed tickets having a value of approximately $11 million, with one property alone reporting unclaimed tickets having a value of about $1.2 million. This is problematic for both the players and the casinos. Regarding the former, the players lose money without receiving any benefit in return. Regarding the latter, the casinos have to deal with accounting issues caused by unredeemed tickets, the costs of ensuring the proper resources are available to keep accurate records of unredeemed tickets, the fact that the value of unredeemed tickets cannot be considered revenue, and the fact that a (sometimes significant) portion of the value of unredeemed tickets is required by regulation to be paid to other entities (such as the state).

The third choice or option is for the player to place a wager other than the minimum allowable wager amount on each payline (i.e., to wager an amount less than the cost to cover) by reducing the wagered-on quantity of paylines. Many players choose the third choice or option because: (a) they do not like or want to perform the first two options; and (b) this is the easiest method of handling this problem, even though the players know that this choice or option has several drawbacks.

One significant drawback with this third option is that winning symbol combinations may occur on paylines that were wagered on in prior plays of the slot game that were not wagered on in the current play (because the player could not afford to continue wagering due to the player's credit balance being less than the cost to cover). This is typically very frustrating for the player, reduces player enjoyment, and does not provide a good gaming experience. Another common drawback with this third option is that the player will often achieve one or more wins after reducing the number of wagered-on paylines that would enable the player to place the minimum allowable wager amount on each payline for a subsequent play, but the player neglects to increase the player's wager (either because the player did not notice the change in the player's credit balance or because the player's plan was to lose the player's remaining credit balance). The player then notices a subsequent outcome that did not lead to an award but that would have led to an award had the player wagered on all paylines. This frustrates the player, reduces player enjoyment, and does not provide a good gaming experience.

Nevertheless, in these situations, players will often just place a wager having the largest possible wager amount that the EGM will allow based on the player's credit balance (i.e., the maximum allowable wager amount). In these situations in which the player's credit balance is less than the cost to cover, the maximum allowable wager amount is necessarily less than the cost to cover. If, after placing a wager having the maximum allowable wager amount on a play of the wagering game, the player does not win such that the player's credit balance is greater than the cost to cover, the player will typically repeat placing a wager having the maximum allowable wager amount (which is still less than the cost to cover in these situations), and will essentially bleed off or waste the player's remaining credit balance until the credit balance reaches zero or until the credit balance reaches an amount below the minimum wager amount (such that the player may not make any more wagers). For many players, this is a slow, painful, hopeless grind, and is detrimental to the players' gaming experiences.

These problems are further illustrated by the following example. In this example, a player deposits a $20 bill in a $0.01 denomination video slot machine that includes a 3×5 set of video reels, includes twenty-five paylines, has a maximum allowable wager of 10 credits per payline, and has a minimum allowable wager amount of 1 credit per payline. Thus, the maximum wager is 10 credits on each of the twenty-five paylines, and the maximum wager amount is 250 credits (or $2.50) per play of the slot game. Further, the cost to cover is $0.25 (i.e., 1 credit on each of the twenty-five paylines). Placing the maximum wager provides two benefits in this example. First, placing the maximum wager results in a wager being made on each of the twenty-five paylines, so that if a winning symbol combination occurs on any of the twenty-five paylines, the player will win a designated amount of credits based on that winning symbol combination and the amount of credits wagered on that payline (which is 10 credits when the player places the maximum wager). Placing the minimum allowable wager amount on each of the twenty-five paylines provides the same benefit. Second, when the player places the maximum wager, the player is eligible to win the top award of $20,000 (in this example) associated with achieving the top winning symbol combination on the twenty-fifth payline.

The following table shows an example series of plays.

| Play # | Credit Balance Before Wager (in credits) | Wager (in credits) | Credit Balance After Wager (in credits) | Awards from Play of Game (in credits) | Credit Balance After Awards (in credits) |
|---|---|---|---|---|---|
| 1 | 2000 | 250 | 1750 | 0 | 1750 |
| 2 | 1750 | 250 | 1500 | 0 | 1500 |
| 3 | 1500 | 250 | 1250 | 0 | 1250 |
| 4 | 1250 | 250 | 1000 | 300 | 1300 |
| 5 | 1300 | 250 | 1050 | 125 | 1175 |
| 6 | 1175 | 250 | 925 | 40 | 965 |
| 7 | 965 | 250 | 715 | 320 | 1035 |
| 8 | 1035 | 250 | 785 | 70 | 715 |
| 9 | 715 | 250 | 465 | 0 | 465 |
| 10 | 465 | 250 | 215 | 30 | 245 |
| 11 | 245 | 200 | 15 | 100 | 115 |
| 12 | 115 | 100 | 15 | 0 | 15 |
| 13 | 15 | 15 | 0 | 7 | 7 |
| 14 | 7 | 7 | 0 | 0 | 0 |

After the twelfth play, the player's credit balance of 15 credits is less than the cost to cover of 25 credits; therefore, the player cannot wager on all 25 paylines. As mentioned above, the player at this point has three choices. If the player wants to keep placing at least the minimum allowable wager amount of 1 credit on each of the twenty-five paylines, the player would need to deposit more money onto the slot machine such that the player's credit balance equals or exceeds the cost to cover of $0.25 (or 25 credits). Alternatively, the player could cash out and receive a redeemable ticket having a monetary value of $0.15. Alternatively, the player could place a wager other than the minimum allowable wager amount on each of the twenty-five paylines.

In this example, the player chooses to place a wager other than the minimum allowable wager amount on each of the twenty-five paylines. Specifically, for the thirteenth play, the player places a wager of 1 credit on each of 15 paylines; that is, the player places a wager having a wager amount of 15 credits. Since the player wagered on only fifteen of the twenty-five paylines, the player will not win any awards displayed along the ten paylines on which a wager was not placed.

After the thirteenth play, the player's credit balance is still less than the cost to cover; therefore, the player cannot place the minimum allowable wager amount on each of the twenty-five paylines. For the fourteenth play, the player places a wager of 1 credit on each of 7 paylines; that is, the player places a wager having a wager amount of 7 credits.

After play the fourteenth play, the player's credit balance is 0, and the player cannot place any more wagers (without depositing more money on the EGM).

This example gaming experience is poor for the player because: (a) the player lost $20; (b) the player likely feels and remembers the long string of losses rather than exciting wins that occurred earlier; (c) the slow bleed extended the player's sense of hopelessness; and (d) the player feels like the final plays were futile plays in which the player was just wasting time and money, in part because the player could not win any award associated with any winning symbol combinations displayed on paylines on which a wager was not placed.

In other words, when the player made the decision not to deposit more money and not to cash out the 15 credits (which is below the cost to cover), the player may feel as though the player was just wasting the $0.15.

This type of negative gaming experience can be made even worse when the allowable bets on an EGM limit how a player can place a wager having an amount less than the maximum wager amount. Using the above example, if the EGM only enables the player to place a wager on either 1 line, 5 lines, 10 lines, 15 lines, or 25 lines at a time (such by providing six different line wager buttons) (i.e., it does not allow the player to wager on any of 2, 3, 4, 6, 7, 8, 9, 11, 12, 13, 14, 16, 17, 18, 19, 20, 21, 22, 23, or 24 lines because the EGM does not have buttons for these quantities of lines), then the player's game ending experience would even be worse. In the above example, the player could not place the wager having the wager amount of 7 credits for the fourteenth play, but could only place a wager having a wager amount of five credits, and assuming no win on that wager, would then have to place a wager having a wager amount of 2 credits. This would increase the length of the bleeding process and make the gaming experience worse because the player would feel that this is a complete waste of a play of the slot game.

It should be appreciated that this same type of problem occurs in other EGMs, such as multi-play draw poker EGMs in which the player can simultaneously wager on multiple draw poker hands (e.g., three hands, five hands, ten hands, fifty hands, or one hundred hands). For example, once a player's credit balance falls below the cost to cover, the player will have to place a wager on fewer total hands.

One method that has been proposed in various published patent applications to address these issues is to allow for a negative credit balance for a player. However, to the knowledge of the above named inventors, casinos have not implemented EGMs that allow for negative credit balances, possibly because this provides a series of potential collection issues for the casinos.

The lack of viable solutions to these problems highlight the continuing need for new and effective solutions to these problems and the continuing need to enhance the gaming experience of players of wagering games.

SUMMARY

Various embodiments of the present disclosure provide a gaming system and method providing a plurality of different player-selectable wager alternatives if a credit balance of a player is less than a designated wager amount (such as a cost to cover a play of a wagering game or a maximum wager amount for the play of the wagering game) and greater than or equal to a lowest eligible credit balance (such as 1 credit). Generally, selecting one of the different wager alternatives when the player's remaining credit balance is less than the designated wager amount and greater than or equal to the lowest eligible wager amount enables the player to utilize the player's remaining credit balance (or any suitable portion thereof) in a manner that is different than, separate from, and in addition to wagering on one or more plays of the wagering game.

More specifically, in one embodiment, the gaming system receives at least one wager from a player and displays at least one play of a wagering game. An amount of each wager is at least a minimum wager amount and at most a maximum wager amount. The gaming system displays a credit balance of the player, and determines if the player's credit balance is less than a designated wager amount and greater than or equal to a lowest eligible credit balance. The designated wager amount is less than or equal to the maximum wager amount, and the lowest eligible credit balance is any suitable non-zero credit balance that is less than the maximum wager amount. If the gaming system determines that the player's credit balance is less than the designated wager amount and greater than or equal to the lowest eligible credit balance, the gaming system displays a plurality of different player-selectable wager alternatives. Each of the different player-selectable wager alternatives is: (a) different than any wagers that can be made on any plays of the wagering game, (b) separate from any wagers that can be made on any plays of the wagering game, and (c) in addition to any wagers that can be made on any plays of the wagering game. The gaming system enables the player to select one of the different player-selectable wager alternatives, and determines if the player selected one of the different player-selectable wager alternatives. If the gaming system receives a selection of one of the different player-selectable wager alternatives from the player, the gaming system provides the selected wager alternative.

In various embodiments, the different player-selectable wager alternatives include one or more of: (a) a bonus wager alternative that enables the player to risk a portion of the player's credit balance to attempt to win an alternative award that, if won, enables the player to play at least one additional play of the wagering game at the designated wager amount; (b) a charity wager alternative that enables the player to donate the monetary equivalent of a portion of the player's credit balance to charity; (c) a comps wager alternative that enables the player to exchange a portion of the player's credit balance for one or more comps; (d) an online casino deposit wager alternative that enables the player to transfer the monetary equivalent of a portion of the player's credit balance to the player's bankroll at an online casino; and (e) a drawing wager alternative that enables the player to exchange a portion of the player's credit balance for one or more drawing or raffle entries.

The gaming system of the present disclosure thus enables players to utilize relatively small remaining credit balances in a variety of new and exciting ways that are more exciting and enjoyable than slowly bleeding those credits off through unfulfilling game play.

Additional features and advantages are described herein, and will be apparent from, the following Detailed Description and the Figures.

DETAILED DESCRIPTION

Providing a Plurality of Different Player-Selectable Wager Alternatives if a Credit Balance is Less than a Designated Wager Amount and Greater than or Equal to a Lowest Eligible Credit Balance Various embodiments of the present disclosure provide a gaming system and method providing a plurality of different player-selectable wager alternatives if a credit balance of a player is less than a designated wager amount (such as a cost to cover a play of a wagering game or a maximum wager amount for the play of the wagering game) and greater than or equal to a lowest eligible credit balance (such as 1 credit). Generally, selecting one of the different player-selectable wager alternatives when the player's remaining credit balance is less than the designated wager amount and greater than or equal to the lowest eligible wager amount enables the player to utilize the player's remaining credit balance (or any suitable portion thereof) in a manner that is different than, separate from, and in addition to wagering on one or more plays of the wagering game. While any credit balances, any wagers, and any awards are displayed as amounts of monetary currency or credits in the embodiments described below, one or more of such credit balances, such wagers, and such awards may be for non-monetary credits or currency, promotional credits, and/or player tracking points or credits.

Figure 1:
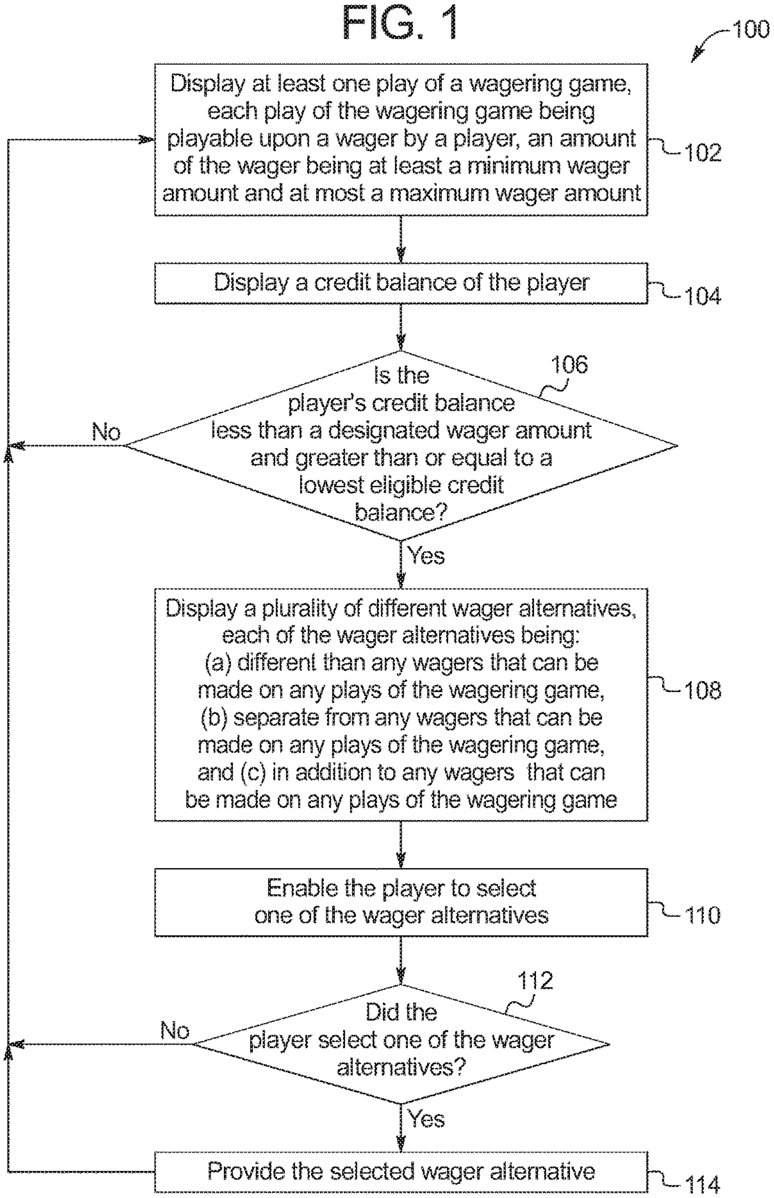
FIG. 1 is a flowchart illustrating an example method of operating one embodiment of the gaming system of the present disclosure.

FIG. 1 illustrates a flowchart of an example process or method 100 of operating one embodiment of the gaming system of the present disclosure. In various embodiments, process 100 is represented by a set of instructions stored in one or more memories and executed by one or more processors. Although process 100 is described with reference to the flowchart shown in FIG. 1, it should be appreciated that many other processes of performing the acts associated with this illustrated process 100 may be employed. For example, the order of certain of the illustrated blocks and/or diamonds may be changed, certain of the illustrated blocks and/or diamonds may be optional, and/or certain of the illustrated blocks and/or diamonds may not be employed.

In operation of this example embodiment, the gaming system receives at least one wager from a player and displays at least one play of a wagering game, as indicated by block 102. An amount of each wager is at least a minimum wager amount and at most a maximum wager amount. The gaming system displays a credit balance of the player, as indicated by block 104. The gaming system determines if the player's credit balance is less than a designated wager amount and greater than or equal to a lowest eligible credit balance, as indicated by diamond 106. The designated wager amount is less than or equal to the maximum wager amount, and the lowest eligible credit balance is any suitable non-zero credit balance that is less than the maximum wager amount. If the gaming system determines that the player's credit balance is not less than the designated wager amount and/or that the player's credit balance is not greater than or equal to the lowest eligible credit balance, process 100 returns to block 102 for further play (assuming the player's credit balance enables further play).

If, on the other hand, the gaming system determines that the player's credit balance is less than the designated wager amount and that the player's credit balance is greater than or equal to the lowest eligible credit balance, the gaming system displays a plurality of different player-selectable wager alternatives, as indicated by block 108. Each of the different player-selectable wager alternatives is: (a) different than any wagers that can be made on any plays of the wagering game, (b) separate from any wagers that can be made on any plays of the wagering game, and (c) in addition to any wagers that can be made on any plays of the wagering game. The gaming system enables the player to select one of the different player-selectable wager alternatives, as indicated by block 110, and determines if the player selected one of the different player-selectable wager alternatives, as indicated by diamond 112. If the gaming system does not receive a selection of one of the different player-selectable wager alternatives from the player, process 100 returns to block 102 for further play (assuming the player's credit balance enables further play). If, on the other hand, the gaming system receives a selection of one of the different player-selectable wager alternatives from the player, the gaming system provides the selected wager alternative, as indicated by block 114, and process 100 returns to block 102 for further play (assuming the player's credit balance enables further play).

Figure 2:
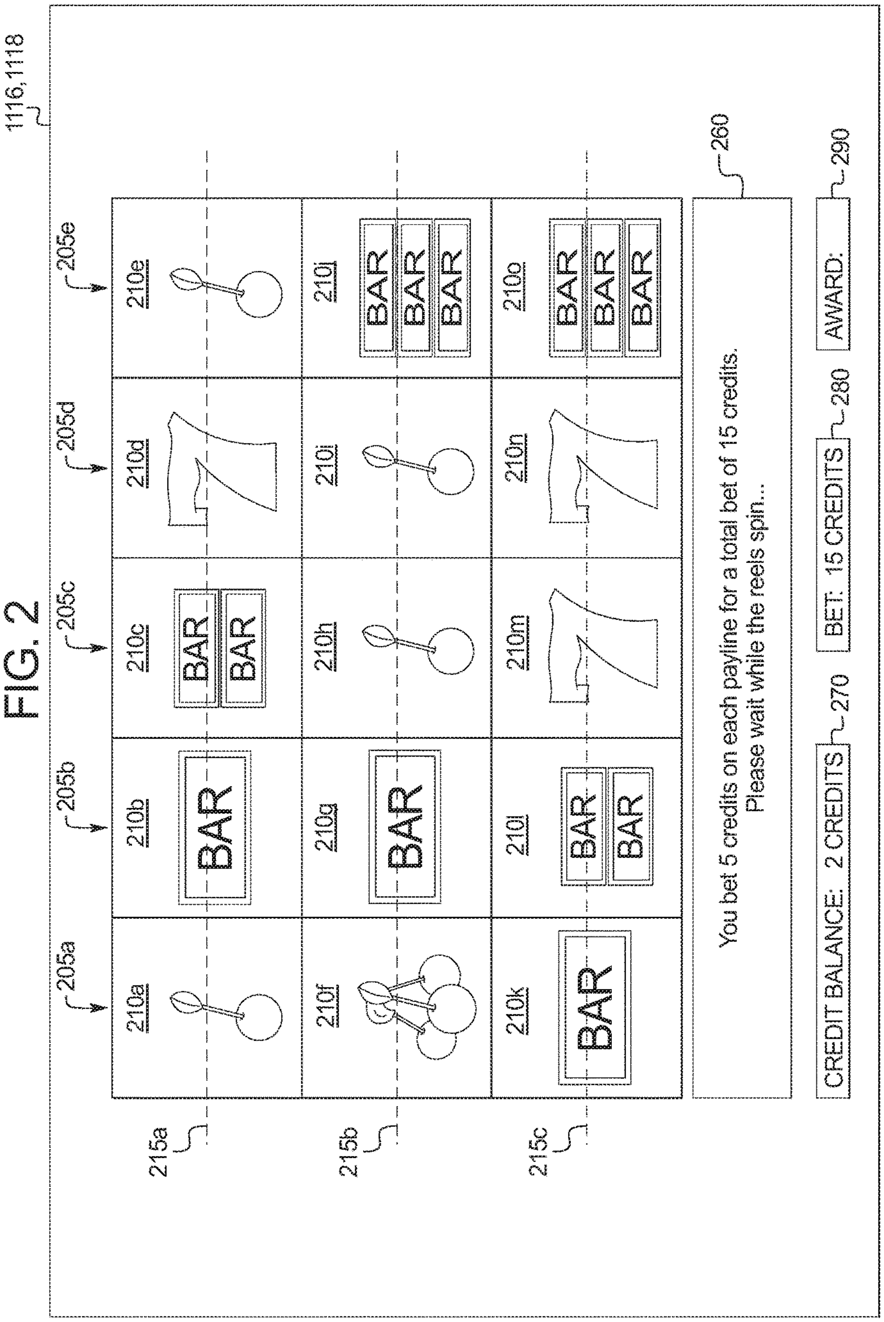
FIGS. 2, 3, and 4 illustrate screen shots of one example embodiment of the gaming system of the present disclosure providing a play of a slot game in accordance with the flowchart of FIG. 1.
Figure 3:
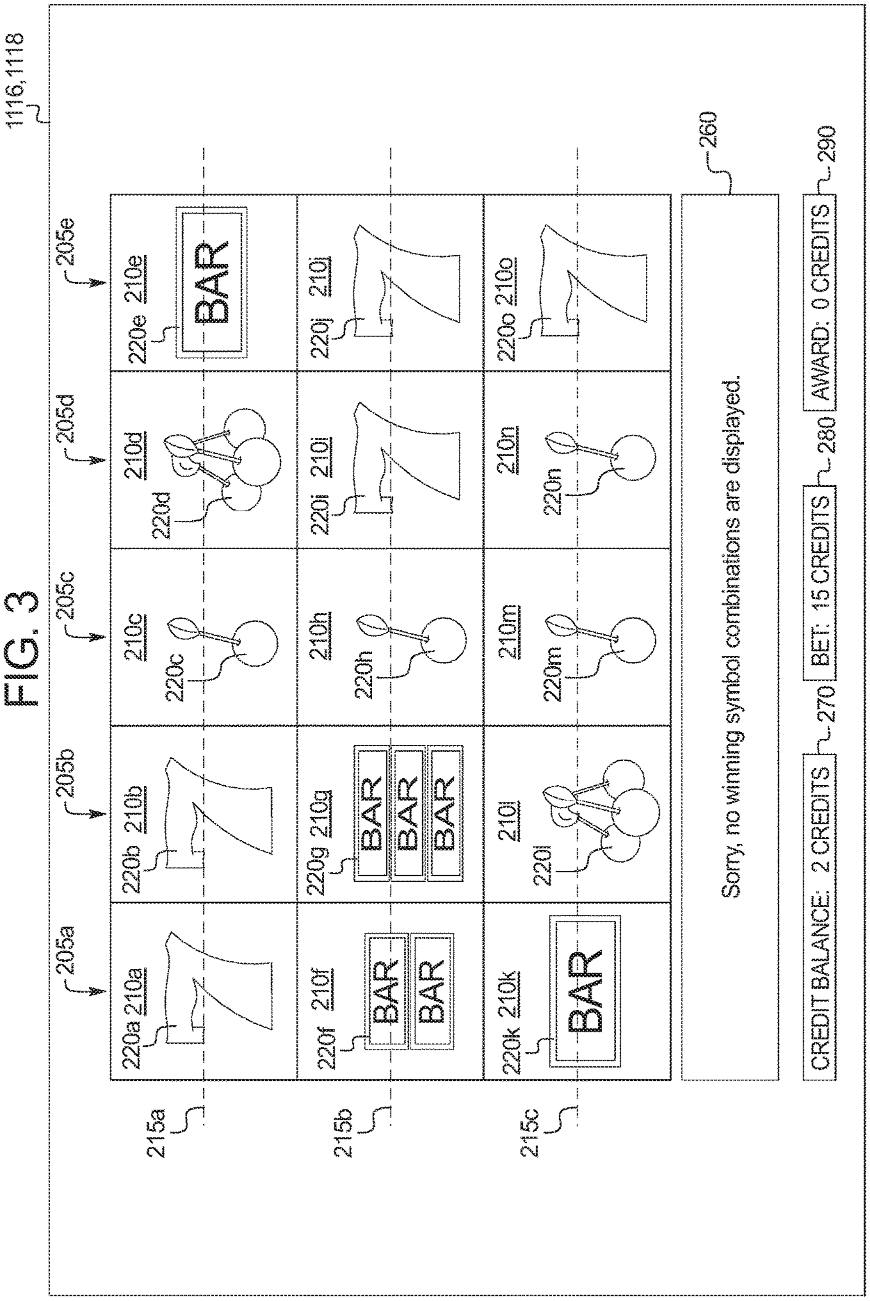
Figure 4:
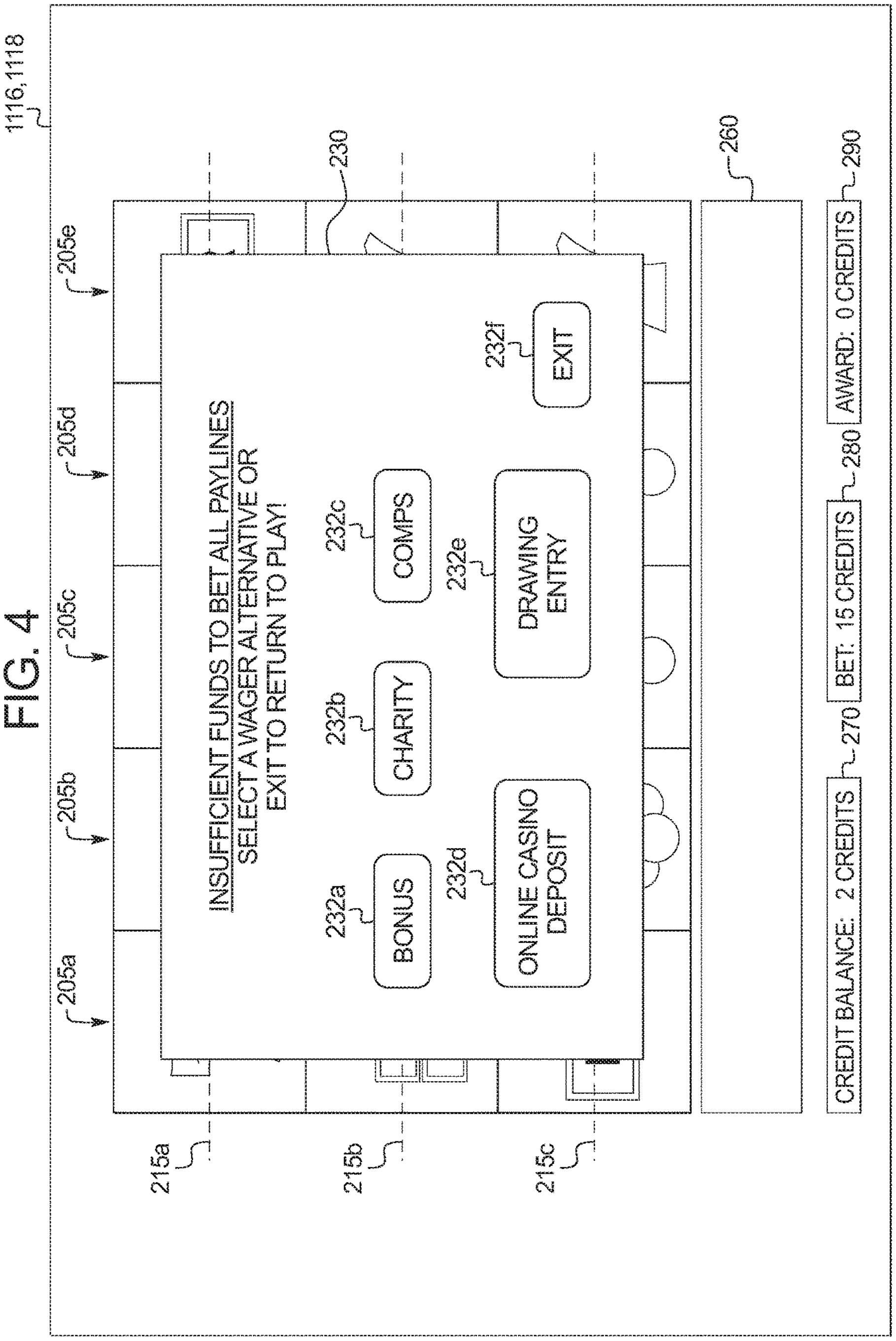

FIGS. 2, 3, and 4 illustrate screen shots of one example embodiment of the gaming system of the present disclosure providing a play of a slot game according to process 100 described above. While the gaming system is configured to operate the slot game in this example embodiment, it should be appreciated that the gaming system may be configured to operate any suitable wagering game (as described below).

In this example embodiment, the gaming system displays, such as on a display device 1116 or 1118 (described below), a plurality of reels 205*a*, 205*b*, 205*c*, 205*d*, and 205*e*, each of which is associated with a plurality of symbols. Each of the reels is associated with, and is configured to display symbols at, a different plurality of symbol display areas including symbol display areas 210*a*, 210*b*, 210*c*, 210*d*, 210*e*, 210*f*, 210*g*, 210*h*, 210*i*, 210*j*, 210*k*, 210*l*, 210*m*, 210*n*, and 210*o* arranged in a 3×5 grid or matrix. More specifically, in this example embodiment: (a) reel 205*a* is associated with, and configured to display symbols at, symbol display areas 210*a*, 210*f*, and 210*k*; (b) reel 205*b* is associated with, and configured to display symbols at, symbol display areas 210*b*, 210*g*, and 210*l*; (c) reel 205*c* is associated with, and configured to display symbols at, symbol display areas 210*c*, 210*h*, and 210*m*; (d) reel 205*d* is associated with, and configured to display symbols at, symbol display areas 210*d*, 210*i*, and 210*n*; and (e) reel 205*e* is associated with, and configured to display symbols at, symbol display areas 210*e*, 210*j*, and 210*o*.

The gaming system displays a plurality of paylines 215*a*, 215*b*, and 215*c*, each of which is associated with a different plurality of the symbol display areas. In this example embodiment: (a) payline 215*a* is associated with symbol display areas 210*a*, 210*b*, 210*c*, 210*d*, and 210*e*; (b) payline 215*b* is associated with symbol display areas 210*f*, 210*g*, 210*h*, 210*i*, and 210*j*; and (c) payline 215*c* is associated with symbol display areas 210*k*, 210*l*, 210*m*, 210*n*, and 210*o*.

The gaming system also displays: (a) a message box 260 in which the gaming system displays a variety of messages or indications before, during, or after play of the slot game; and (b) a plurality of meters including: (i) a credit meter 270 in which the gaming system displays the player's credit balance (in credit or currency form), (ii) a wager meter 280 that displays any wager placed on a play of the slot game (in credit or currency form), and (iii) an award meter 290 that displays any awards won during the play of the slot game (in credit or currency form). While in this illustrated example the gaming system indicates the player's credit balance, any wagers, and any awards in the form of amounts of credits, it should be appreciated that such indications may alternatively or additionally be made in the form of amounts of currency.

As noted above, the gaming system displays the player's credit balance in the credit meter 270. Initially, upon a deposit of value to the gaming system, the credit meter displays the player's credit balance as an amount equal to the total value deposited (e.g., the total value of any deposited bills or the total value of any deposited redeemable tickets). The gaming system enables the player to use the player's credit balance (which is displayed in the credit meter) to place wagers on plays of the slot game. For each play of the slot game, the gaming system deducts a wager amount of a wager placed on that play of the slot game from the player's credit balance (i.e., the credit meter 270 displays the reduced credit balance), and adds amounts of any awards won for that play of the wagering game to the player's credit balance (i.e., the credit meter 270 displays the increased credit balance if the player wins any awards).

In this example embodiment, the maximum allowable wager amount per payline for a play of the slot game is 10 credits such that the maximum wager amount for a play of the slot game is 30 credits (i.e., a wager of 10 credits on each of the three paylines). Additionally, in this example embodiment, the minimum allowable wager amount per payline for a play of the slot game is 1 credit such that the cost to cover a play of the slot game is 3 credits (i.e., a wager of 1 credit on each of the three paylines). It should be appreciated that the maximum allowable wager amount per payline and the minimum allowable wager amount per payline may be any suitable amounts.

Turning to FIG. 2, the gaming system receives a wager of 5 credits on each of the three paylines from the player, which results in a total wager amount of 15 credits as indicated by the wager meter 280. The gaming system updates the player's credit balance in the credit meter 270 from 17 credits to 2 credits to reflect the 15 credit wager. The gaming system displays the following message in message box 260: "YOU BET 5 CREDITS ON EACH PAYLINE FOR A TOTAL BET OF 15 CREDITS. PLEASE WAIT WHILE THE REELS SPIN . . . . "

As illustrated in FIG. 3, the gaming system spins and stops the reels such that a plurality of the symbols associated with the reels are displayed at the symbol display areas. In this example embodiment, the gaming system stops the reels such that: Seven symbol 220*a* is displayed at symbol display area 210*a*, Seven symbol 220*b* is displayed at symbol display area 210*b*, Cherry symbol 220*c* is displayed at symbol display area 210*c*, Triple Cherry symbol 220*d* is displayed at symbol display area 210*d*, Bar symbol 220*e* is displayed at symbol display area 210*e*, Double Bar symbol 220*f* is displayed at symbol display area 210*f*, Triple Bar symbol 220*g* is displayed at symbol display area 210*g*, Cherry symbol 220*h* is displayed at symbol display area 210*h*, Seven symbol 220*i* is displayed at symbol display area 210*i*, Seven symbol 220*j* is displayed at symbol display area 210*j*, Bar symbol 220*k* is displayed at symbol display area 210*k*, Triple Cherry symbol 220*l* is displayed at symbol display area 210*l*, Cherry symbol 220*m* is displayed at symbol display area 210*m*, Cherry symbol 220*n* is displayed at symbol display area 210*n*, and Seven symbol 220*o* is displayed at symbol display area 210*o*.

The gaming system makes an award determination based on the displayed symbols and a paytable associated with the slot game (not shown). More specifically, the gaming system determines whether any of a plurality of winning symbol combinations included in the paytable are displayed along paylines 215*a*, 215*b*, and/or 215*c*. In this example embodiment, the gaming system determines that none of the winning symbol combinations are displayed along any of the three paylines and, therefore, determines an award of 0 credits for the play of the slot game and displays the 0 credit award in the award meter 290.

In this example embodiment, after determining any awards for a play of the slot game and updating the player's credit balance accordingly, the gaming system determines if the player's credit balance is less than a designated wager amount and if the player's credit balance is greater than or equal to a lowest eligible credit balance. In this example embodiment, the designated wager amount is equal to the cost to cover a play of the wagering game, which is 3 credits (i.e., a wager of 1 credit (the minimum allowable wager amount) on each of the three paylines), and the lowest eligible credit balance is 1 credit. Here, the gaming system determines that the player's credit balance of 2 credits is less than 3 credits (the designated wager amount) and greater than 1 credit (the lowest eligible credit balance).

As illustrated in FIG. 4, when the gaming system determines that the player's credit balance is less than the designated wager amount and greater than or equal to the lowest eligible credit balance, the gaming system displays a plurality of different player-selectable wager alternatives. More specifically, the gaming system displays the following different player-selectable wager alternatives in a pop-up or dialog box 230: (a) a bonus wager alternative 232*a*; (b) a charity wager alternative 232*b*; (c) a comps wager alternative 232*c*; (d) an online casino deposit wager alternative 232*d*, and (e) a drawing wager alternative 232*e*. The gaming system also displays an exit indicator 232*f* in the pop-up or dialog box 230 that, if selected by the player, causes the gaming system to close the pop-up or dialog box 230 and return to standard game play. Each of these different player-selectable wager alternatives is discussed in turn below.

Bonus Wager Alternative

Generally, if the gaming system receives a selection of the bonus wager alternative from the player, the gaming system provides the bonus wager alternative to the player, which enables the player to risk a portion of the player's credit balance to attempt to win an alternative award. More specifically, if the gaming system receives a selection of the bonus wager alternative from the player, the gaming system enables the player to risk a portion of the player's credit balance (such as the player's entire credit balance) on a play of a bonus or alternative game (or one of a plurality of different bonus or alternative games) to attempt to win an alternative award associated with that bonus or alternative game. Each alternative award is of an amount that, if the gaming system determines to provide that alternative award, causes the gaming system to increase the player's credit balance to a level that enables the player to play at least one additional play of the slot game at the designated wager amount. If the player does not win the alternative award, however, the gaming system reduces the player's credit balance by the amount risked.

For example, if the designated wager amount is equal to the cost to cover a play of the slot game, the player's credit balance is less than the designated wager amount and greater than or equal to the lowest eligible credit balance, and the gaming system receives a selection of the bonus wager alternative from the player, the gaming system enables the player to risk the player's entire credit balance on a play of a bonus or alternative game to attempt to win an alternative award. In this example, if the gaming system determines to provide the alternative award, the gaming system increases the player's credit balance such that the player may play at least one additional play of the slot game at the cost to cover. In another example, if the designated wager amount is equal to the maximum wager amount for a play of the slot game, the player's credit balance is less than the designated wager amount and greater than or equal to the lowest eligible credit balance, and the gaming system receives a selection of the bonus wager alternative from the player, the gaming system enables the player to risk the player's entire credit balance on a play of a bonus or alternative game to attempt to win the alternative award. In this example, if the gaming system determines to provide the alternative award, the gaming system increases the player's credit balance such that the player may play at least one additional play of the slot game at the maximum wager amount.

In various embodiments, such as those in which the gaming system displays the player's credit balance as an amount or quantity of credits, the alternative award is a quantity of credits. In certain of these embodiments, if the gaming system determines to provide the alternative award, the gaming system reduces the player's credit balance by the amount risked and adds the quantity of credits to the player's credit balance. In such embodiments in which the amount risked is the player's entire credit balance, the quantity of credits is greater than or equal to the designated wager amount. In such embodiments in which the amount risked is less than the player's entire credit balance, the quantity of credits is a quantity that, when added to the player's credit balance after reducing the player's credit balance by the amount risked, results in the player's credit balance being greater than or equal to the designated wager amount. In another embodiment, if the gaming system determines to provide the alternative award, the gaming system adds the quantity of credits to the player's credit balance without reducing the player's credit balance by the amount risked. It should thus be appreciated that, in these embodiments, when the gaming system determines to provide the alternative award, the gaming system enables the player to play at least one play of the wagering game at the designated wager amount. In these embodiments, if the gaming system determines not to provide the alternative award, the gaming system reduces the player's credit balance by the amount risked.

In certain embodiments, if the gaming system determines to provide the alternative award and the gaming system adds the quantity of credits to the player's credit balance, the gaming system enables the player to immediately cash out the added quantity of credits. In other such embodiments, if the gaming system determines to provide the alternative award and the gaming system adds the quantity of credits to the player's credit balance, the gaming system automatically initiates at least one additional play of the wagering game at the designated wager amount before enabling the player to cash out the added quantity of credits. In other such embodiments, if the gaming system determines to provide the alternative award and the gaming system adds the quantity of credits to the player's credit balance, the gaming system does not enable the player to cash out of the gaming system until the player initiates at least one additional play of the wagering game at the designated wager amount.

In various embodiments, such as those in which the gaming system displays the player's credit balance as an amount of currency, the alternative award is an amount of currency. In certain of these embodiments, if the gaming system determines to provide the alternative award, the gaming system reduces the player's credit balance by the amount risked and adds the amount of currency to the player's credit balance. In such embodiments in which the amount risked is the player's entire credit balance, the amount of currency is greater than or equal to the designated wager amount. In such embodiments in which the amount risked is less than the player's entire credit balance, the amount of currency is an amount that, when added to the player's credit balance after reducing the player's credit balance by the amount risked, results in the player's credit balance being greater than or equal to the designated wager amount. In another embodiment, if the gaming system determines to provide the alternative award, the gaming system adds the amount of currency to the player's credit balance without reducing the player's credit balance by the amount risked. It should thus be appreciated that, in these embodiments, when the gaming system determines to provide the alternative award, the gaming system enables the player to play at least one play of the wagering game at the designated wager amount. In these embodiments, if the gaming system determines not to provide the alternative award, the gaming system reduces the player's credit balance by the amount risked.

In certain such embodiments, if the gaming system determines to provide the alternative award and the gaming system adds the amount of currency to the player's credit balance, the gaming system enables the player to immediately cash out the added amount of currency. In other such embodiments, if the gaming system determines to provide the alternative award and the gaming system adds the amount of currency to the player's credit balance, the gaming system automatically initiates at least one additional play of the wagering game at the designated wager amount before enabling the player to cash out the added amount of currency. In other such embodiments, if the gaming system determines to provide the alternative award and the gaming system adds the quantity of currency to the player's credit balance, the gaming system does not enable the player to cash out of the gaming system until the player initiates at least one additional play of the wagering game at the designated wager amount.

In another embodiment, the alternative award is a quantity of free plays of the slot game at the designated wager amount. In one such embodiment, if the gaming system determines to provide the alternative award, the gaming system reduces the player's credit balance by the amount risked and enables the player to play the quantity of free plays at the designated wager amount. In another such embodiment, if the gaming system determines to provide the alternative award, the gaming system enables the player to play the quantity of free plays at the designated wager amount without reducing the player's credit balance by the amount risked. In these embodiments, if the gaming system determines not to provide the alternative award, the gaming system reduces the player's credit balance by the amount risked.

In certain embodiments, the gaming system employs the same paytable used in standard, wagered-on plays of the slot game for each of the quantity of free plays of the slot game. In other embodiments, the gaming system employs a paytable different from the paytable used in standard, wagered-on plays of the slot game for at least one of the quantity of free plays of the slot game.

In a further embodiment, the alternative award is a quantity of free plays of one or more bonus games. In one such embodiment, if the gaming system determines to provide the alternative award, the gaming system reduces the player's credit balance by the amount risked and enables the player to play the quantity of free plays of the bonus game(s). In another such embodiment, if the gaming system determines to provide the alternative award, the gaming system enables the player to play the quantity of free plays of the bonus game(s) without reducing the player's credit balance by the amount risked. In these embodiments, if the gaming system determines not to provide the alternative award, the gaming system reduces the player's credit balance by the amount risked.

In one such embodiment, if the gaming system determines to provide the alternative award, the gaming system provides the player with one or more bonus credits, and enables the player to use those bonus credits to purchase one or more plays of one or more bonus games. For example, the gaming system provides the player with 10 bonus credits and enables the player to purchase one or more plays of one or more of the following bonus games: bonus game 1 for 10 bonus credits per play, bonus game 2 for 5 bonus credits per play, and bonus game 3 for 2 credits per play. It should be appreciated that, in certain embodiments, the gaming system does not enable the bonus credits to be converted into currency or wagering game credits.

As noted above, the bonus wager alternative is associated with a bonus or alternative game and, in certain embodiments, a plurality of different bonus or alternative games. Each bonus or alternative game is associated with an alternative award and a probability of providing that alternative award. In various embodiments, the probability of providing the alternative award associated with a given bonus or alternative game is determined based on: (a) the player's credit balance; (b) the alternative award itself (e.g., the quantity of credits, amount of currency, or the quantity of free plays of the wagering game at the designated wager amount); or (c) both (a) and (b). In certain embodiments, for a given credit balance, the probability of providing the alternative award associated with a given bonus or alternative game decreases as the value of the alternative award increases, and vice-versa. That is, for a given credit balance, the gaming system is less likely to provide a relatively more favorable alternative award than it is to provide a relatively less favorable alternative award. In other embodiments, for a given alternative award, the probability of providing that alternative award decreases as the player's credit balance decreases, and vice-versa. That is, for a given alternative award, the gaming system is more likely to provide that alternative award if the player's credit balance is relatively high, and is less likely to provide that alternative award if the player's credit balance is relatively low. It should thus be appreciated that, in general, the larger the gap between the player's credit balance (or the amount risked, if less than the player's credit balance) and the alternative award (e.g., the quantity of credits, the amount of currency, or the quantity of free plays of the wagering game at the designated wager amount), the less likely it is that the gaming system will provide the alternative award.

In various embodiments, the probability of providing a particular alternative award varies based on the portion of the player's credit balance risked, the average expected payback percentage of the slot game, and the designated wager amount such that the probability of the player winning the alternative award is consistent with the average expected payback percentage of the slot game. In one example embodiment:

$$\text{Probability} = (\text{Average Expected Payback Percentage}) * \left(\frac{\text{Designated Wager Amount}}{\text{Amount Risked}}\right)$$

Thus, since the average expected payback percentage and the designated wager amount are known in this example embodiment, the probability of providing the alternative award varies based on the portion of the player's credit balance risked on the bonus wager alternative. For instance, if: (a) the cost to cover a play of a slot game is 40 credits, (b) the alternative award associated with a particular bonus or alternative game is equal to the cost to cover of 40 credits, and (c) the slot game has an average expected payback percentage of 90%, the probability of providing the alternative award is equal to: (a) 2.25% when the player risks 1 credit, (b) 56.25% when the player risks 25 credits, and (c) 87.75% when the player risks 39 credits. Further, if: (a) the cost to cover a play of a slot game is 500 credits, (b) the alternative award associated with a particular bonus or alternative game is equal to the cost to cover of 500 credits, and (c) the slot game has an average expected payback percentage of 92%, the probability of providing the alternative award is equal to 11.96% when the player risks 65 credits.

In various embodiments, in addition to or instead of one or more of the above factors, the probability of providing the alternative award is: (a) determined based on a weighted probability table (such as a look-up table), (b) determined based on game play, (c) determined based on a player's status in a player loyalty program, (d) determined by an operator of a casino or other venue in which the gaming system is located, (e) determined by a manufacturer of the gaming system, or (f) any suitable combination thereof.

In certain embodiments, for each bonus or alternative game, when the gaming system displays that bonus or alternative game the gaming system also displays the probability of providing the alternative award associated with that bonus or alternative game or an indication or representation of that probability. The gaming system may do so in any suitable manner. For instance, in one embodiment, the gaming system displays a percentage representing the probability of providing the alternative award. In another embodiment, the gaming system displays a wheel, one portion commensurate with the probability of providing the alternative award having one color and another portion commensurate with the probability of not providing the alternative award having another different color. For example, if the probability of providing the alternative award is 25% (and, therefore, the probability of not providing the alternative award is 75%), one-quarter of the wheel will have one color, such as green, and three-quarters of the wheel will have a different color, such as red. This enables the player to quickly visually determine the chance that the player will win the alternative award if the player chooses that bonus wager alternative. In another embodiment, the gaming system displays an edge-on wheel having a plurality of landings or pockets, similar to a roulette wheel. In this embodiment, certain of the pockets (commensurate with the probability of providing the alternative award) are associated with the gaming system providing the alternative award, and certain of the pockets (commensurate with the probability of not providing the alternative award) are associated with the gaming system not providing the alternative award. For example, if the probability of providing the alternative award is 25% (and, therefore, the probability of not providing the alternative award is 75%) and the wheel has twelve landings or pockets, assuming the landings or pockets are of the same size, one-quarter of the pockets (i.e., four pockets) will be associated with the gaming system providing the alternative award, and three-quarters of the pockets (i.e., eight pockets) will be associated with the gaming system not providing the alternative award.

As noted above, in certain embodiments, if the gaming system receives a selection of the bonus wager alternative from the player, the gaming system provides one of a plurality of different bonus or alternative games. In these embodiments, if the gaming system receives a selection of the bonus wager alternative from the player, the gaming system displays a representation of each of the plurality of bonus or alternative games and enables the player to select one of the representations (i.e., enables the player to select one of the bonus or alternative games). It should be appreciated that, in various embodiments, the gaming system also enables the player to cash out of the gaming system or return to the slot game without selecting any of the bonus or alternative games at this point. If the gaming system receives a selection of one of the bonus or alternative games, the gaming system determines whether to provide the alternative award associated with the selected bonus or alternative game based on the probability of providing the alternative award associated with the selected bonus or alternative game. If the gaming system determines to provide the alternative award, the gaming system provides the alternative award such that the player may play at least one play of the slot game at the designated wager amount. If the gaming system determines not to provide the alternative award, the gaming system reduces the player's credit balance by the amount risked.

In certain embodiments, the gaming system displays a representation of the alternative award determination while or after the gaming system determines whether to provide the alternative award. For instance, in one embodiment in which the gaming system displays the colored wheel, the gaming system displays the wheel spinning about its center relative to a fixed pointer. When the wheel stops spinning, the color of the section of the wheel to which the pointer is pointing determines whether the gaming system provides or does not provide the alternative award. In another example embodiment in which the gaming system displays the colored wheel, the gaming system holds the wheel static and displays a "chasing light" pointer around the wheel. When the chasing light pointer stops, the color of the section of the wheel adjacent to the pointer determines whether the gaming system provides or does not provide the alternative award. In another example embodiment in which the gaming system displays the edge-on wheel, the gaming system displays an indicator (such as a ball) moving relative to the wheel and landing in one of the landings or pockets. The landing or pocket in which the indicator lands determines whether the gaming system provides or does not provide the alternative award. It should be appreciated that the gaming system may employ any suitable mechanism to display the representation of the alternative award determination.

It should be appreciated that the slot game has an average expected payback percentage. It should also be appreciated that each of the bonus or alternative games has an individual average expected payback percentage. It should further be appreciated that in embodiments including a plurality of bonus or alternative games, the set of bonus or alternative games has a collective average expected payback percentage. In various embodiments, if: (a) the individual average expected payback percentage of one any bonus or alternative games, or (b) the collective average expected payback percentage of the set of bonus or alternative games is greater than (or, in certain embodiments, greater than or equal to) the average expected payback percentage of the slot game, the gaming system requires the player to have played a designated quantity of plays (such as one play) of the slot game while wagering at least the designated wager amount (or any other suitable wager amount) on each of those plays prior to activating the bonus wager alternative. This prevents players from depositing a low amount of value (such as a redeemable ticket having a monetary value representing a small quantity of credits) and taking advantage of the more favorable average expected payback percentage of the bonus or alternative game(s). In other embodiments, as noted above, the bonus or alternative games may have an average expected payback percentage equal or substantially equal to the average expected payback percentage of the slot game.

In various embodiments, the gaming system provides a bonus or alternative game associated with a probability of providing an alternative award only if that probability of providing the alternative award is greater than a minimum probability. In other embodiments, the gaming system provides a bonus or alternative game associated with a probability of providing an alternative award only if that probability of providing the alternative award is less than a maximum probability.

In certain embodiments, the gaming system provides a bonus or alternative game or a set of bonus or alternative games only if the individual average expected payback percentage of that bonus or alternative game or the collective average payback percentage of that set of bonus or alternative games is greater than a minimum average expected payback percentage. In other embodiments, the gaming system provides a bonus or alternative game or a set of bonus or alternative games only if the individual average expected payback percentage of that bonus or alternative game or the collective average expected payback percentage of that set of bonus or alternative games is less than a maximum average expected payback percentage.

Figure 5A:
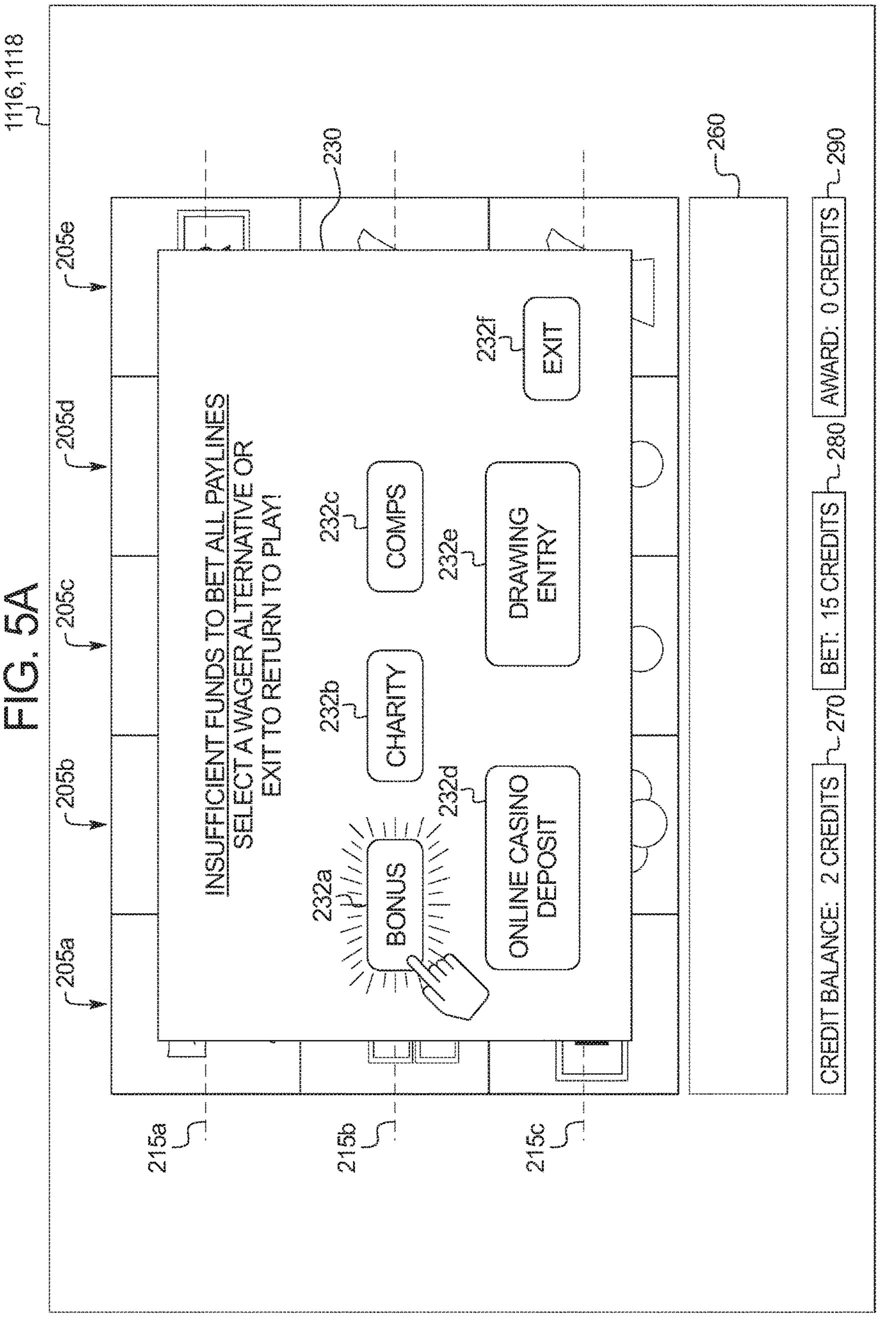
FIGS. 5A, 5B, 5C, 5D, and 5E illustrate screen shots of one example embodiment of the gaming system of the present disclosure providing one of a plurality of bonus or alternative games after receiving a selection of the bonus wager alternative.
Figure 5B:
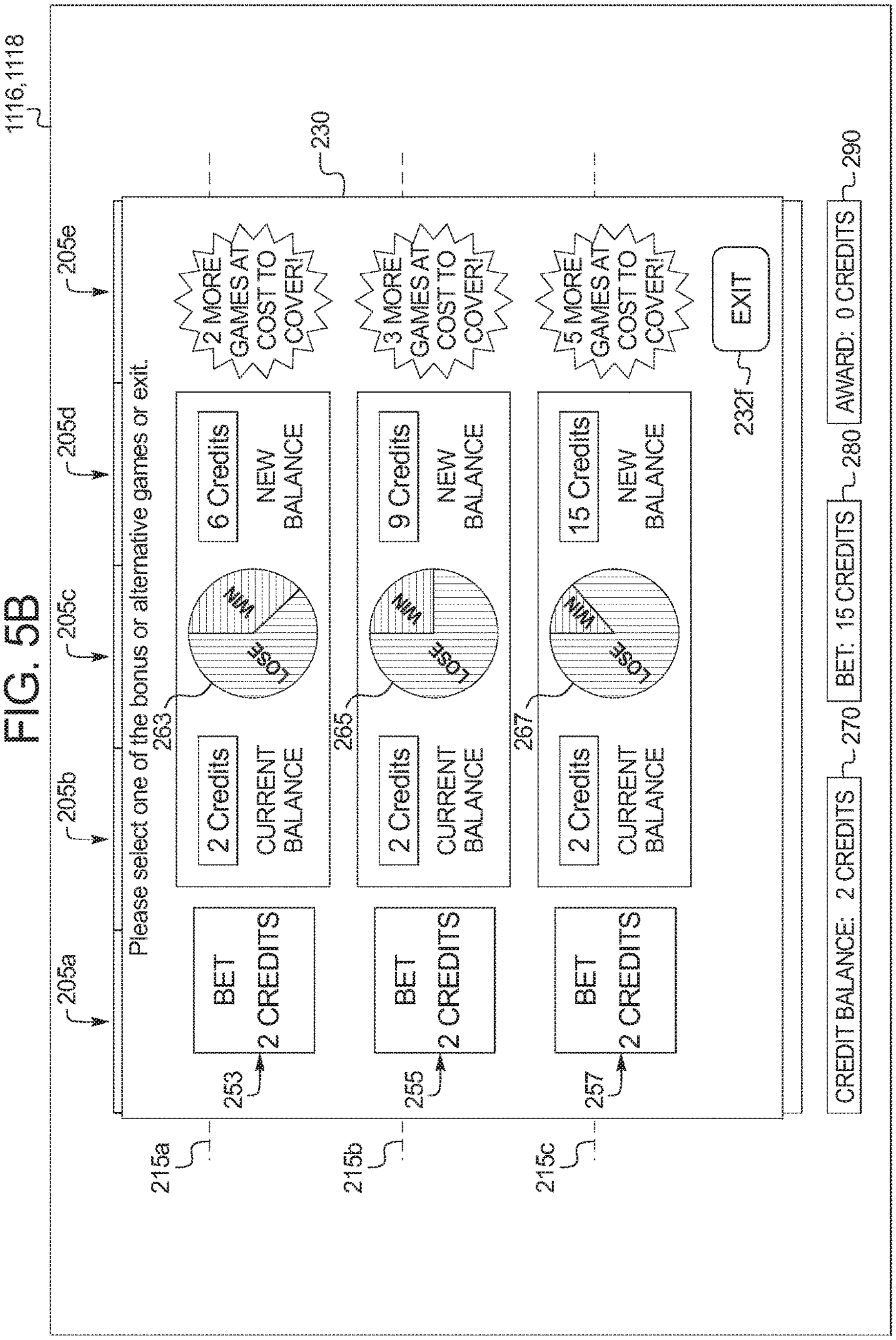

FIGS. 5A, 5B, 5C, 5D, and 5E illustrate screen shots of one example embodiment of the gaming system of the present disclosure providing one of a plurality of bonus or alternative games after receiving a selection of the bonus wager alternative. More specifically, as illustrated in FIG. 5A, the gaming system receives a selection of the bonus wager alternative 232*a*. As shown in FIG. 5B, the gaming system displays representations of each of a plurality of bonus or alternative games in the pop-up or dialog box 230 and enables the player to select one of the displayed representations to select one of the bonus or alternative games. Specifically, the gaming system displays the following: (a) a representation of a first bonus or alternative game 253, (b) a representation of a second bonus or alternative game 255, and (c) a representation of a third bonus or alternative game 257.

In this example embodiment: (a) the first bonus or alternative game 253 is associated with: (i) an amount risked of 2 credits (i.e., the player's entire credit balance); (ii) a first alternative award of 6 credits (i.e., the equivalent of 2× the cost to cover, which is the designated wager amount in this example embodiment); and (c) a probability of providing the first alternative award of 37.5% (i.e., the probability of the player winning the first alternative award); (b) the second bonus or alternative game 255 is associated with: (a) an amount risked of 2 credits, (b) a second alternative award of 9 credits (i.e., the equivalent of 3× the cost to cover), and (c)

a probability of providing the second alternative award of 25%; and (3) the third bonus or alternative game 257 is associated with: (a) an amount risked of 2 credits, (b) a third alternative award of 15 credits (i.e., the equivalent of 5× the cost to cover), and (c) a probability of providing the third alternative award of 12.5%.

In this example, the gaming system displays the probability or an indication or representation of the probability of providing the alternative award associated with each of the bonus or alternative games by displaying colored wheels that represent those probabilities. Specifically, 37.5% of wheel 263, which is associated with first bonus or alternative game 253, is shaded to represent the player winning the first alternative award (i.e., the gaming system providing the first alternative award), and 62.5% of wheel 263 is shaded in a different manner to represent the player not winning the first alternative award (i.e., the gaming system not providing the first alternative award). Wheels 265 and 267, which as associated with the second bonus or alternative game and the third bonus or alternative game, respectively, are shaded similarly. This enables the player to quickly and easily determine the probability of winning each of the first, second, and third alternative awards by viewing the wheels. It should be appreciated that, in this example embodiment, as the value of the alternative awards increases the probability of providing the alternative awards decrease.

Figure 5C:
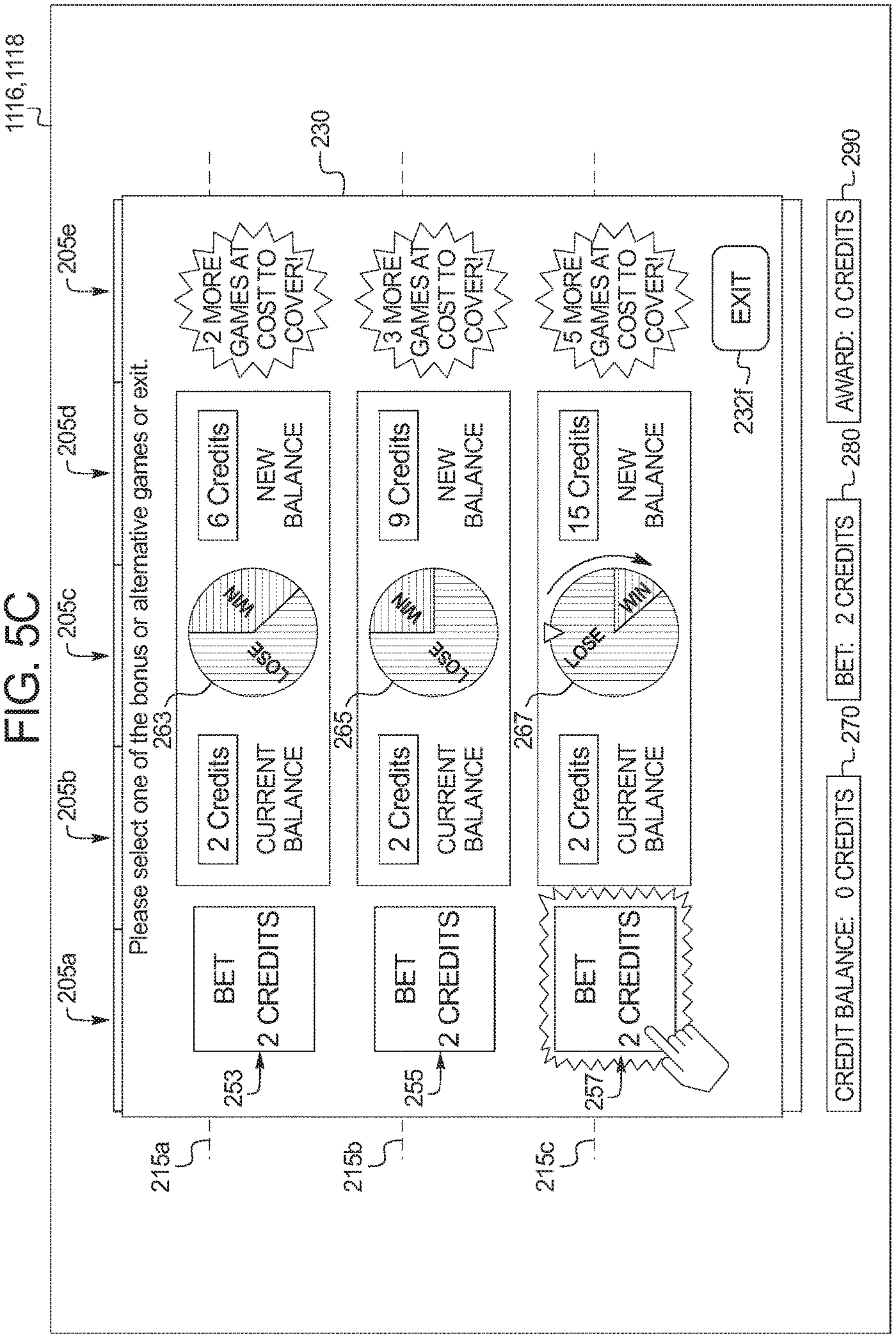
Figure 5D:
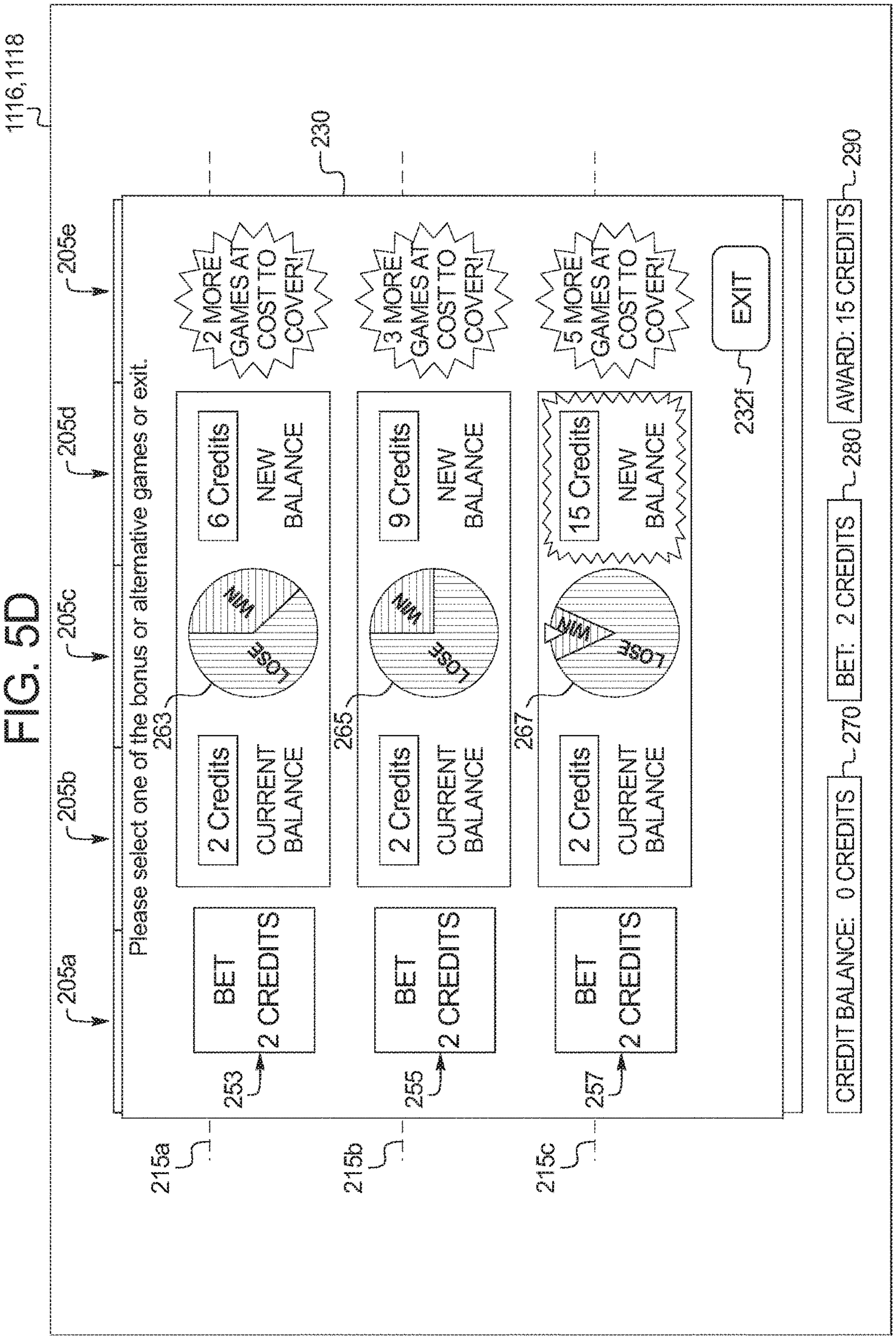
Figure 5E:
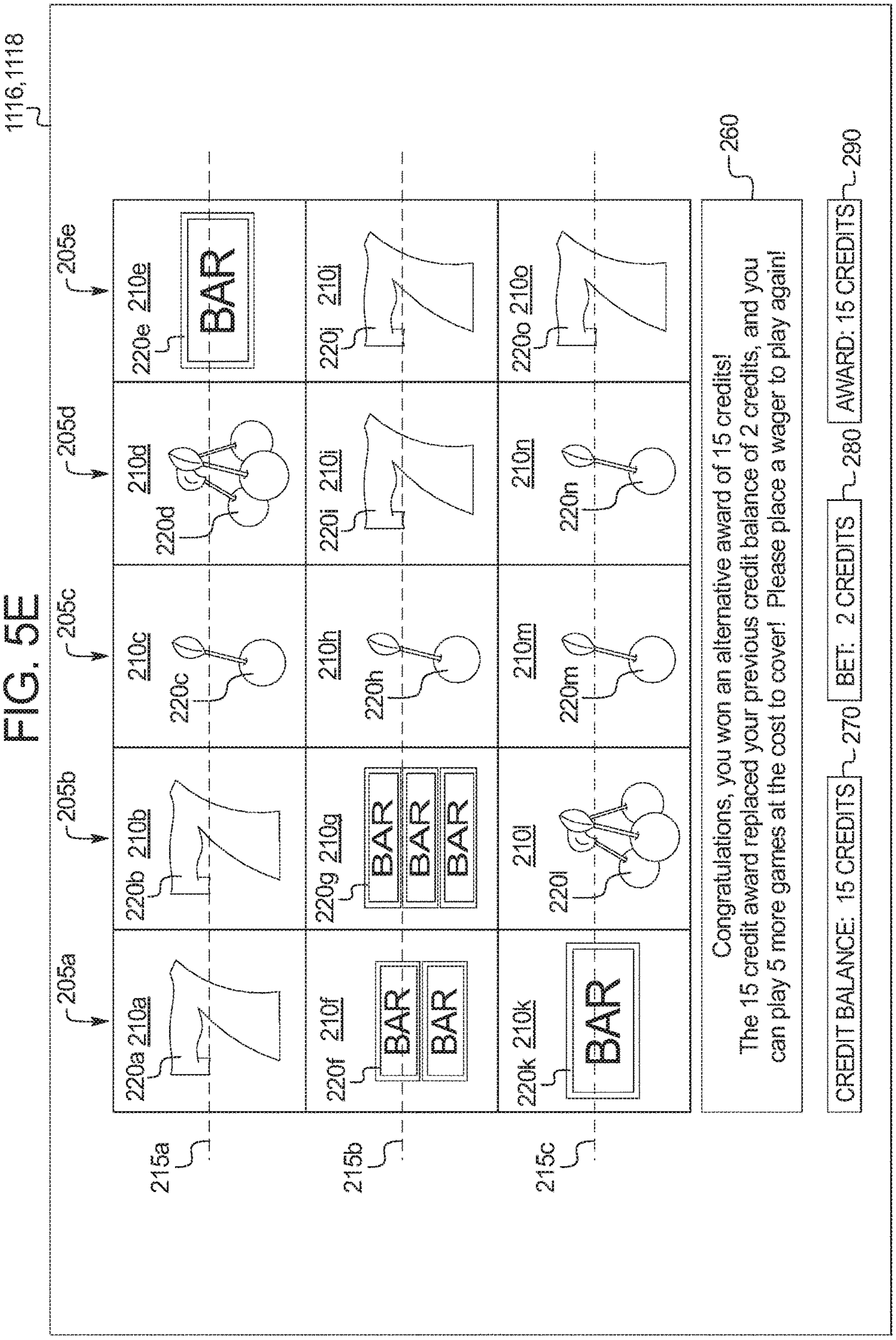

In this example embodiment, as illustrated in FIG. 5C, the gaming system receives a selection of the representation of the third bonus or alternative game 257 from the player. Put differently, the player chose to wager the player's entire credit balance of 2 credits for a 12.5% chance to win the third alternative award of 15 credits, which if won would enable the player to play at least five more plays of the slot game at the cost to cover. The gaming system determines whether to provide the player with the third alternative award, and displays a representation of that determination by spinning wheel the 267 relative to a fixed pointer. As illustrated in FIG. 5D, the wheel 267 stopped and the pointer points to the section representing the player winning the third alternative award. Accordingly, as illustrated in FIG. 5E, the gaming system replaces the player's credit balance with the third alternative award of 15 credits, and displays the following message in message box 260: "CONGRATULATIONS, YOU WON AN ALTERNATIVE AWARD OF 15 CREDITS! THE 15 CREDIT AWARD REPLACED YOUR PREVIOUS CREDIT BALANCE OF 2 CREDITS, AND YOU CAN PLAY FIVE MORE GAMES AT THE COST TO COVER! PLEASE PLACE A WAGER TO PLAY AGAIN!"

Charity Wager Alternative

If the gaming system receives a selection of the charity wager alternative from the player, the gaming system provides the charity wager alternative to the player, which enables the player to donate the monetary equivalent of a portion of the player's credit balance (such as the monetary equivalent of the player's entire credit balance) to charity. It should be appreciated that the charity may be any suitable charity, such as (but not limited to): (a) a charity automatically selected by the gaming system, (b) a charity randomly selected by the gaming system from a group of charities, (c) a predetermined charity, (d) a player-selected charity, (e) a charity selected by the player from a group of charities, (f) a local charity, (g) one of a plurality of local charities, (h) an international charity, or (i) any suitable combination thereof. The gaming system reduces the player's credit balance by an amount of credits equivalent to the monetary value donated to the charity.

Figure 6A:
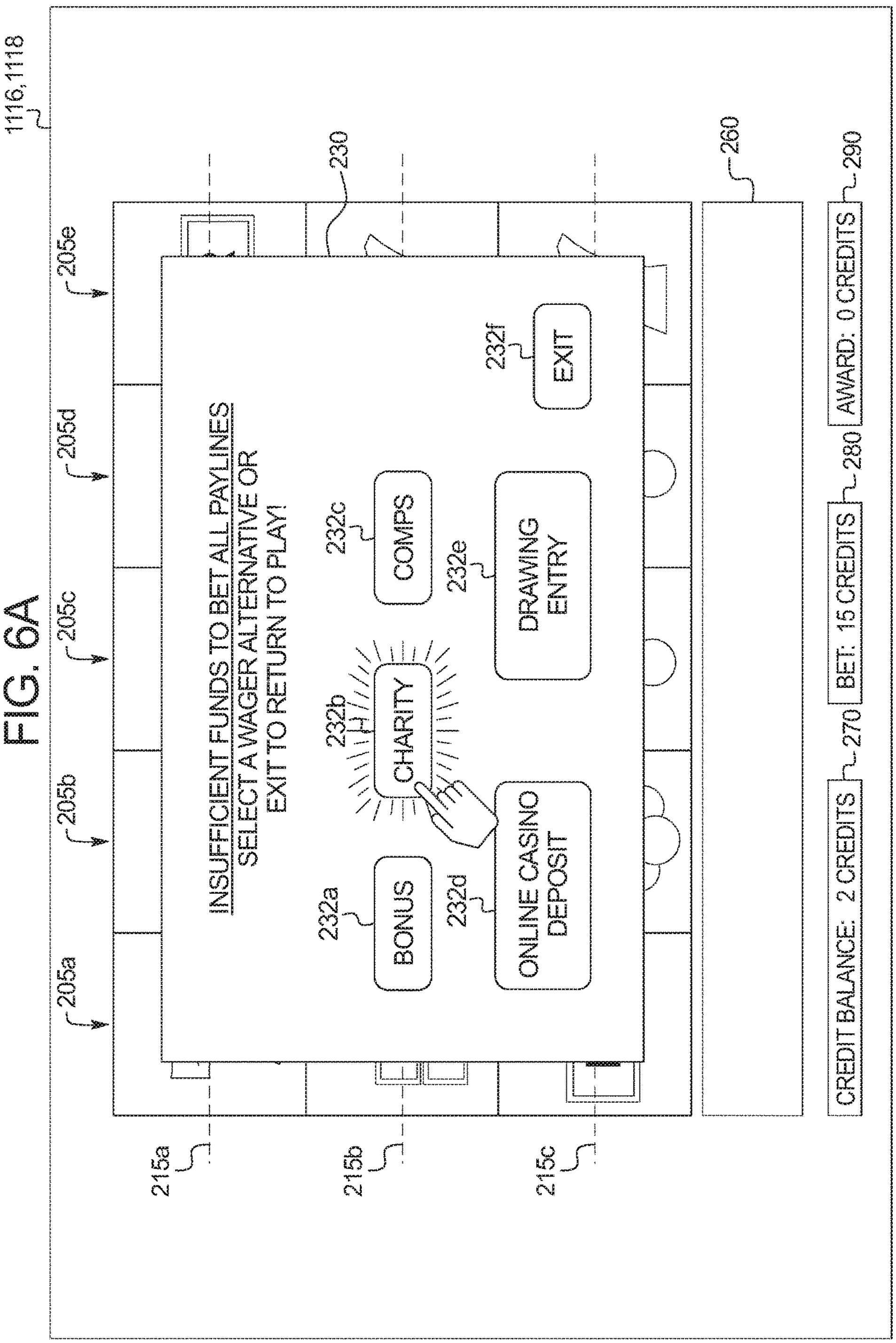
FIGS. 6A and 6B illustrate screen shots of one example embodiment of the gaming system of the present disclosure providing the charity wager alternative.
Figure 6B:
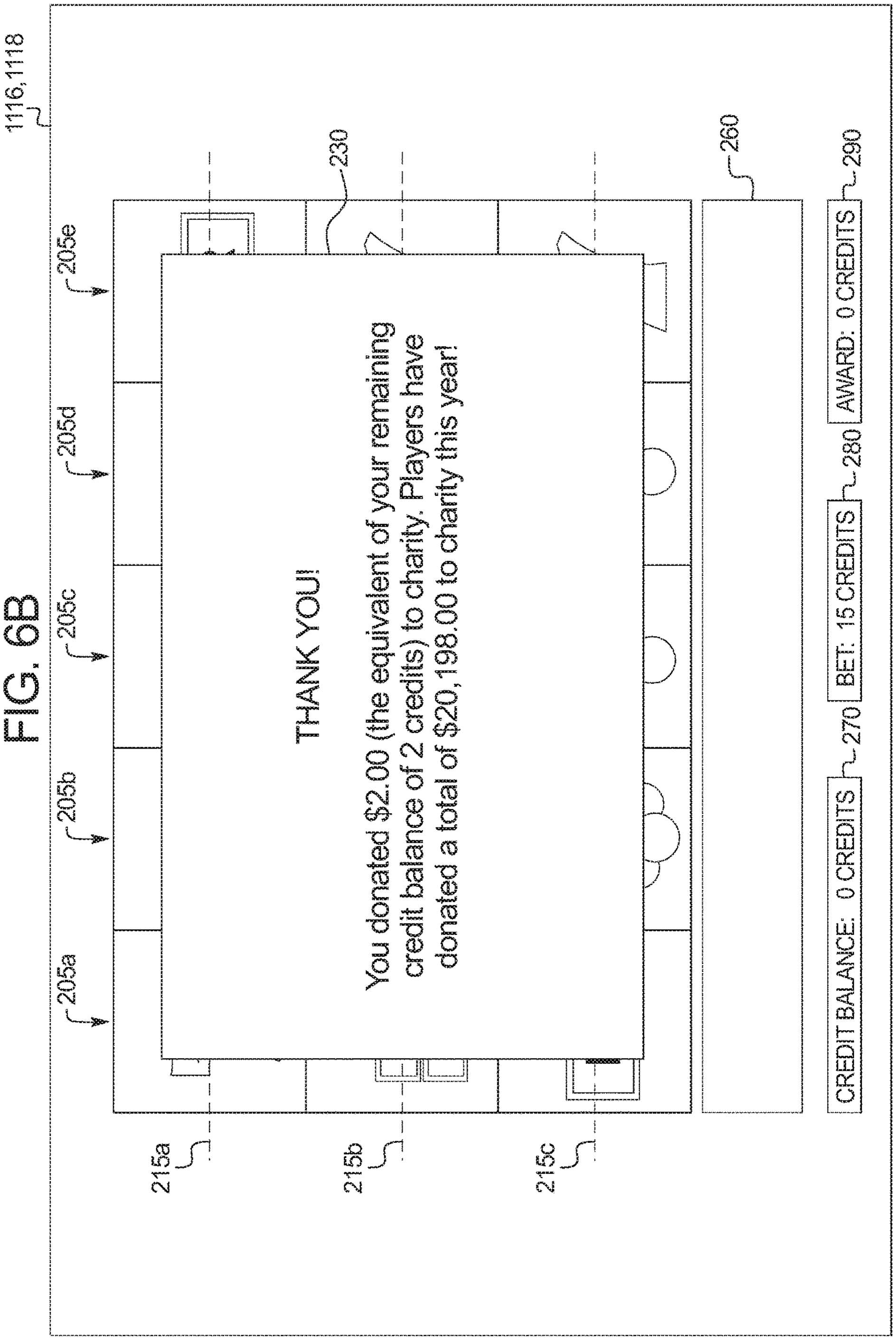

FIGS. 6A and 6B illustrate screen shots of one example embodiment of the gaming system of the present disclosure providing the charity wager alternative after receiving a selection of the charity wager alternative. More specifically, as illustrated in FIG. 6A, the gaming system receives a selection of the charity wager alternative 232*b*. Accordingly, in this example embodiment, the gaming system donates the monetary equivalent of the player's entire credit balance of 2 credits ($2.00 in this example embodiment) to a predetermined charity. As shown in FIG. 6B, the gaming system displays the following message in pop-up or dialog box 230: "THANK YOU! YOU DONATED $2.00 (THE EQUIVALENT OF YOUR REMAINING CREDIT BALANCE OF 2 CREDITS) TO CHARITY. PLAYERS HAVE DONATED A TOTAL OF $20,198.00 TO CHARITY THIS YEAR!"

Comps Wager Alternative

If the gaming system receives a selection of the comps wager alternative from the player, the gaming system provides the comps wager alternative to the player, which enables the player to exchange a portion of the player's credit balance (such as the player's entire credit balance) for one or more comps, such as a free night's stay at a hotel, a free buffet, a free lunch, a free cup of coffee, a t-shirt, and the like. In one embodiment, the gaming system determines the comp to provide to the player based on the exchanged portion of the player's credit balance (or the monetary equivalent thereof). In certain embodiments, the value of the comp increases as the monetary value of the exchanged portion of the player's credit balance increases. In another embodiment, the gaming system determines a plurality of different available comps based on the exchanged portion of the player's credit balance (or the monetary equivalent thereof), and enables the player to select one (or more) of the available comps to receive in exchange for that portion of the player's credit balance. The gaming system reduces the player's credit balance by the amount of credits exchanged for the comp(s).

Figure 7A:
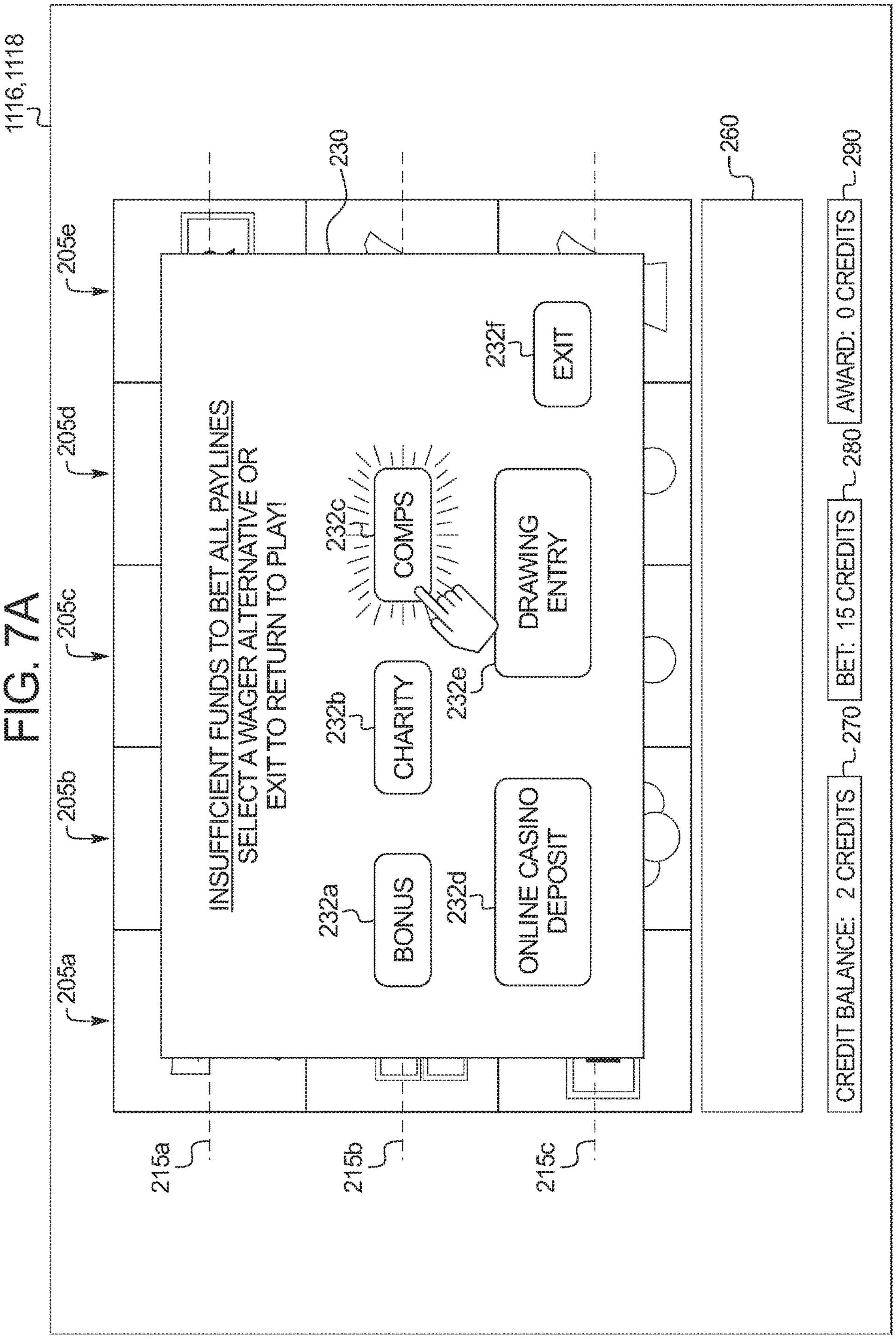
FIGS. 7A and 7B illustrate screen shots of one example embodiment of the gaming system of the present disclosure providing the comps wager alternative.
Figure 7B:
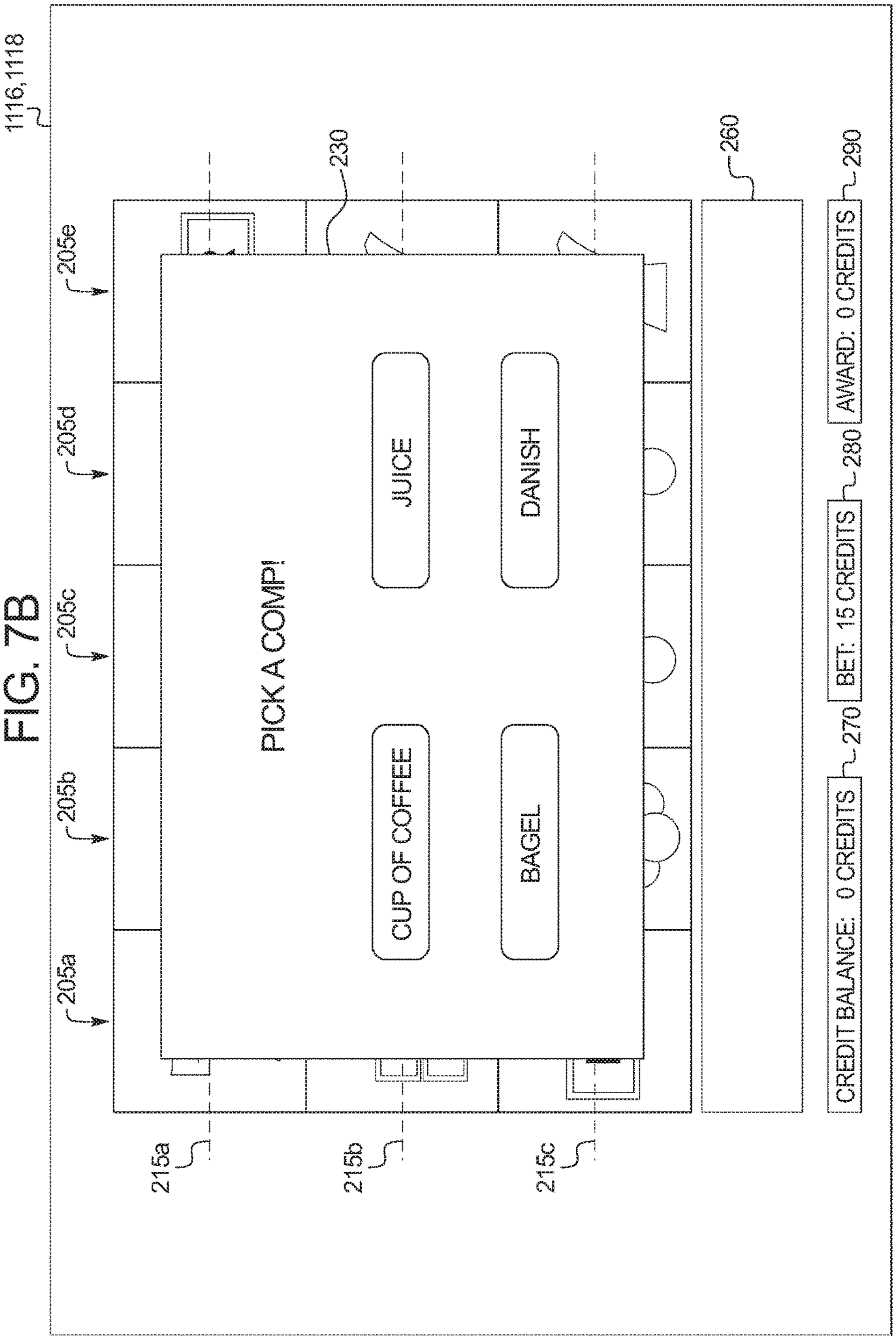

FIGS. 7A and 7B illustrate screen shots of one example embodiment of the gaming system of the present disclosure providing the comps wager alternative after receiving a selection of the comps wager alternative. More specifically, as illustrated in FIG. 7A, the gaming system receives a selection of the comps wager alternative 232*c*. In this example embodiment, the gaming system determines a plurality of available comps based on the monetary equivalent of the player's entire credit balance of 2 credits ($2.00 in this example embodiment): a cup of coffee, a bottle of juice, a bagel, and a danish. As shown in FIG. 7B, the gaming system displays these available comps and instructs the player to "PICK A COMP!" to receive in exchange for the player's credit balance.

Online Casino Deposit Wager Alternative

If the gaming system receives a selection of the online casino deposit wager alternative from the player, the gaming system provides the online casino deposit wager alternative to the player, which enables the player to transfer the monetary equivalent of a portion of the player's credit balance (such as the monetary equivalent of the player's entire credit balance) to the player's bankroll at an online casino. The gaming system reduces the player's credit balance by the amount of credits (or the monetary value thereof) transferred to the player's online casino bankroll. In one embodiment, the gaming system enables the player to transfer the monetary equivalent of a portion of the player's credit balance to the player's bankroll at one of a plurality of different online casinos. In another embodiment, the gaming system enables the player to transfer the monetary equivalent of a first portion of the player's credit balance to the player's bankroll at a first online casino and the monetary equivalent of a second portion of the player's credit balance to the player's bankroll at a second different online casino. In one embodiment in which the online casino does not accept monetary wagers (i.e., accepts wagers of non-monetary credits), the gaming system transfers a quantity of non-monetary credits equivalent to the monetary value of the transferred portion of the player's credit balance (using any suitable exchange rate).

Figure 8A:
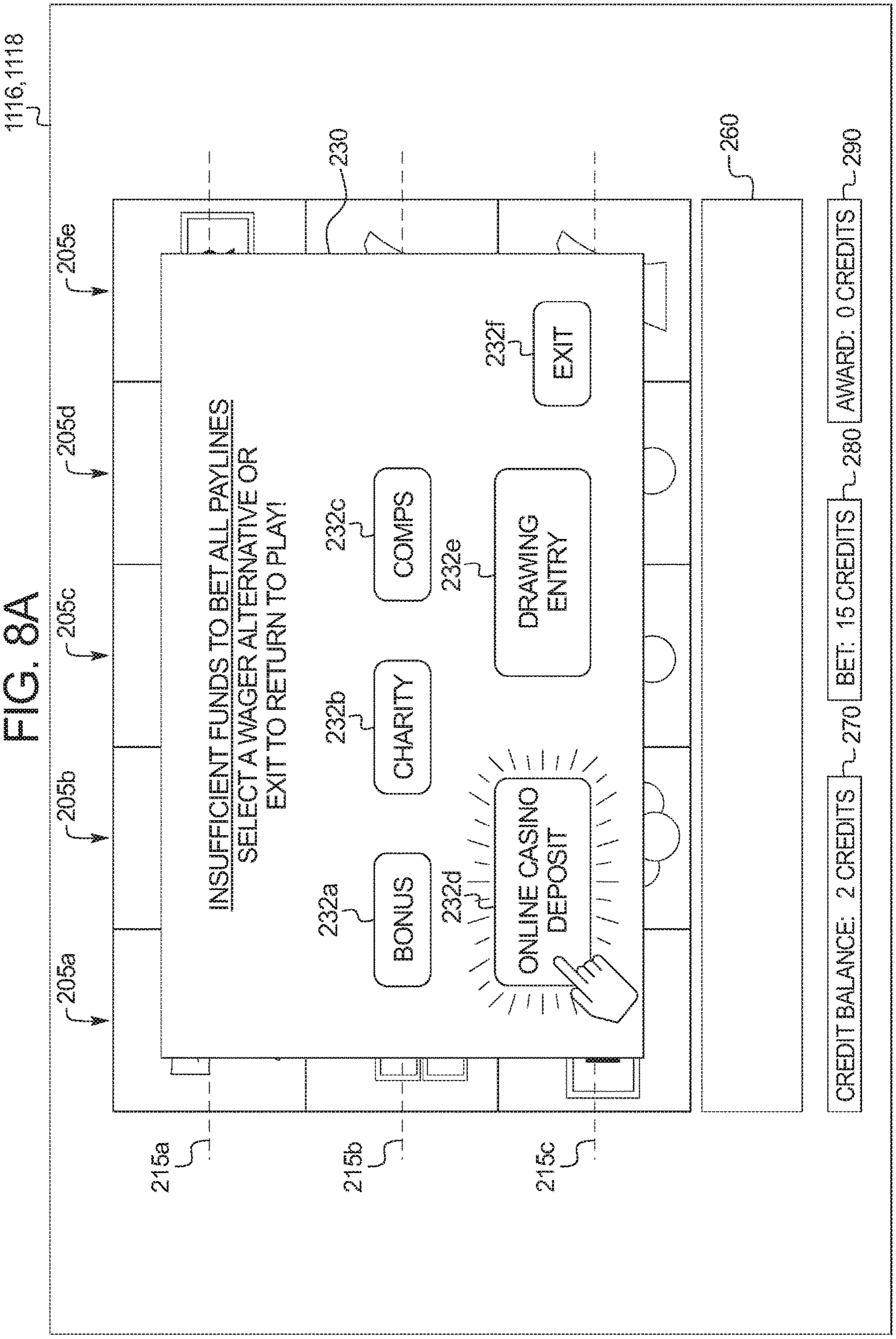
FIGS. 8A and 8B illustrate screen shots of one example embodiment of the gaming system of the present disclosure providing the online casino deposit wager alternative.
Figure 8B:
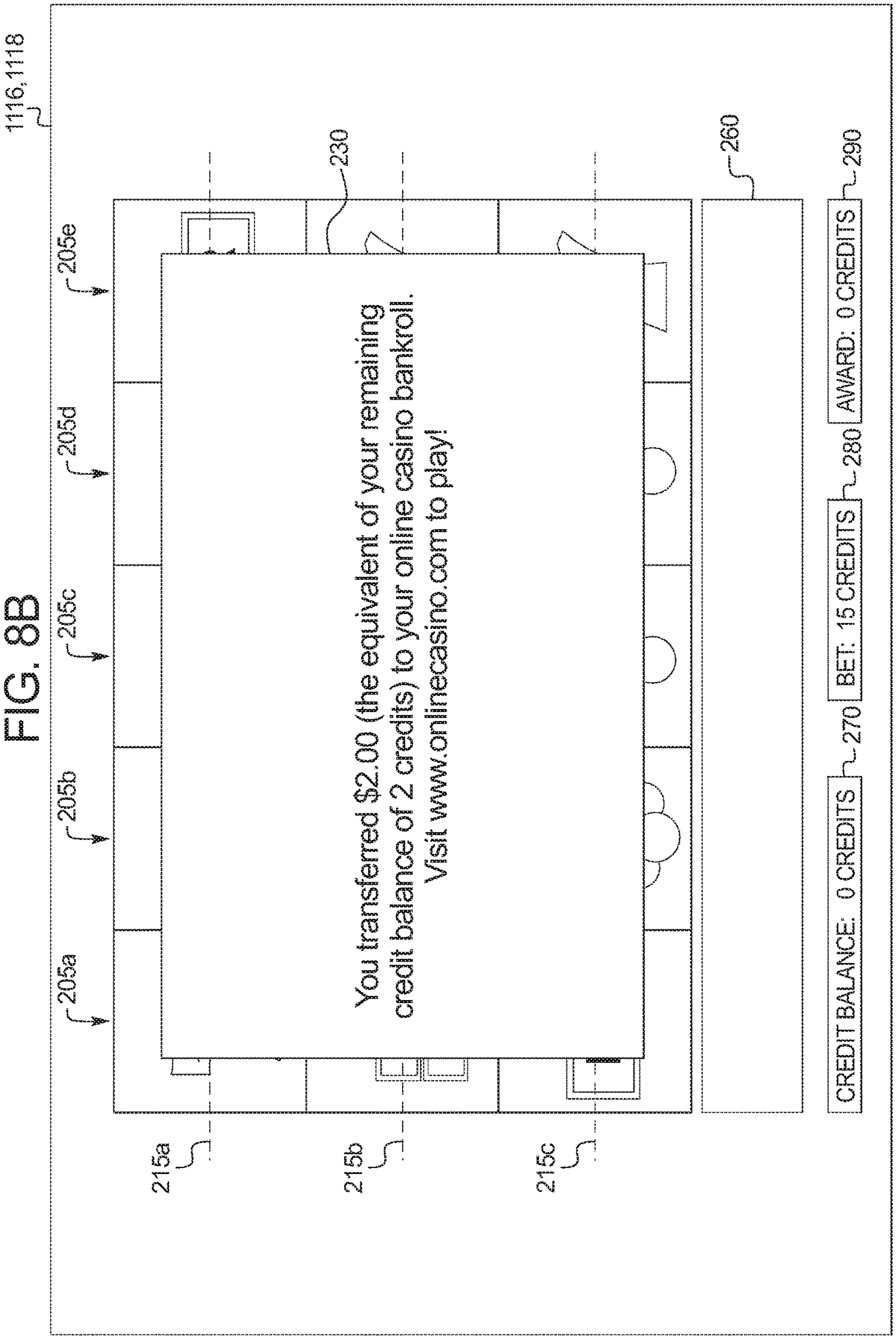

FIGS. 8A and 8B illustrate screen shots of one example embodiment of the gaming system of the present disclosure providing the online casino deposit wager alternative after receiving a selection of the online casino deposit wager alternative. More specifically, as illustrated in FIG. 8A, the gaming system receives a selection of the online casino deposit wager alternative 232*d*. The gaming system transfers the $2.00 monetary equivalent of the player's entire credit balance of 2 credits to the player's online casino bankroll. As shown in FIG. 8B, the gaming system displays the following message in pop-up or dialog box 230: "YOU TRANSFERRED $2.00 (THE EQUIVALENT OF YOUR REMAINING CREDIT BALANCE OF 2 CREDITS) TO YOUR ONLINE CASINO BANKROLL. VISIT WWW.ONLINECASINO.COM TO PLAY!"

Drawing Wager Alternative

If the gaming system receives a selection of the drawing wager alternative from the player, the gaming system provides the drawing wager alternative to the player, which enables the player to exchange a portion of the player's credit balance (such as the player's entire credit balance) for one or more drawing or raffle entries. The gaming system reduces the player's credit balance by the amount of credits exchanged for the drawing entry(ies). In one embodiment, the gaming system determines the quantity of drawing entries to provide to the player based on the exchanged portion of the player's credit balance (or the monetary equivalent thereof). In certain embodiments, the quantity of drawing entries increases as the monetary value of the exchanged portion of the player's credit balance increases. For instance, for each designated monetary unit (such as $0.01) exchanged by the player, the gaming system provides the player a designated quantity of drawing entries (such as one drawing entry). In certain embodiments, the award pool for the drawing includes the currency and credits exchanged for drawing tickets; that is, in these embodiments, the award pool is funded by the exchange of credits and currency for drawing entries. In various embodiments, the drawing is one in which the winner or winners must be present to win any awards.

Figure 9A:
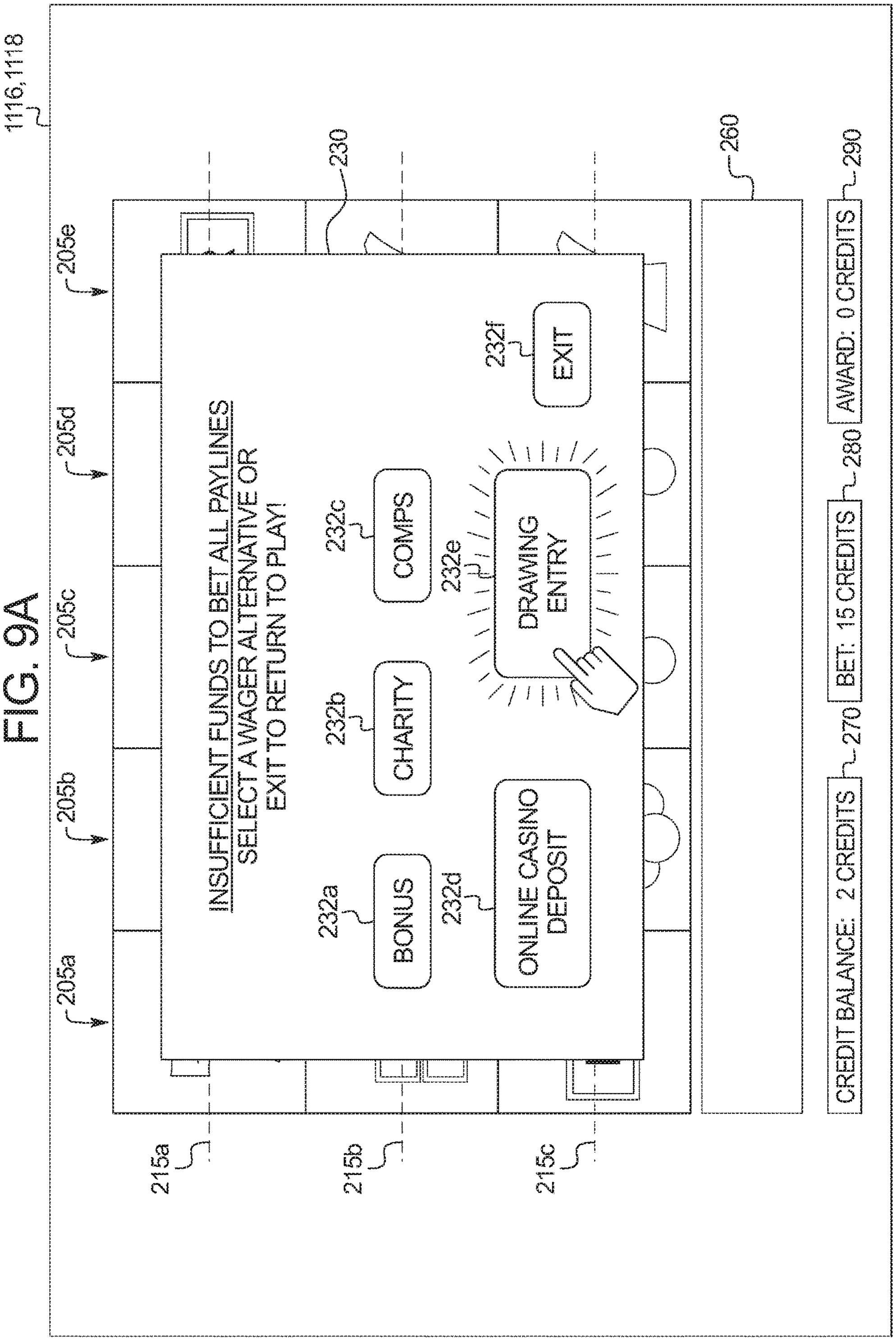
FIGS. 9A and 9B illustrate screen shots of one example embodiment of the gaming system of the present disclosure providing the drawing wager alternative.
Figure 9B:
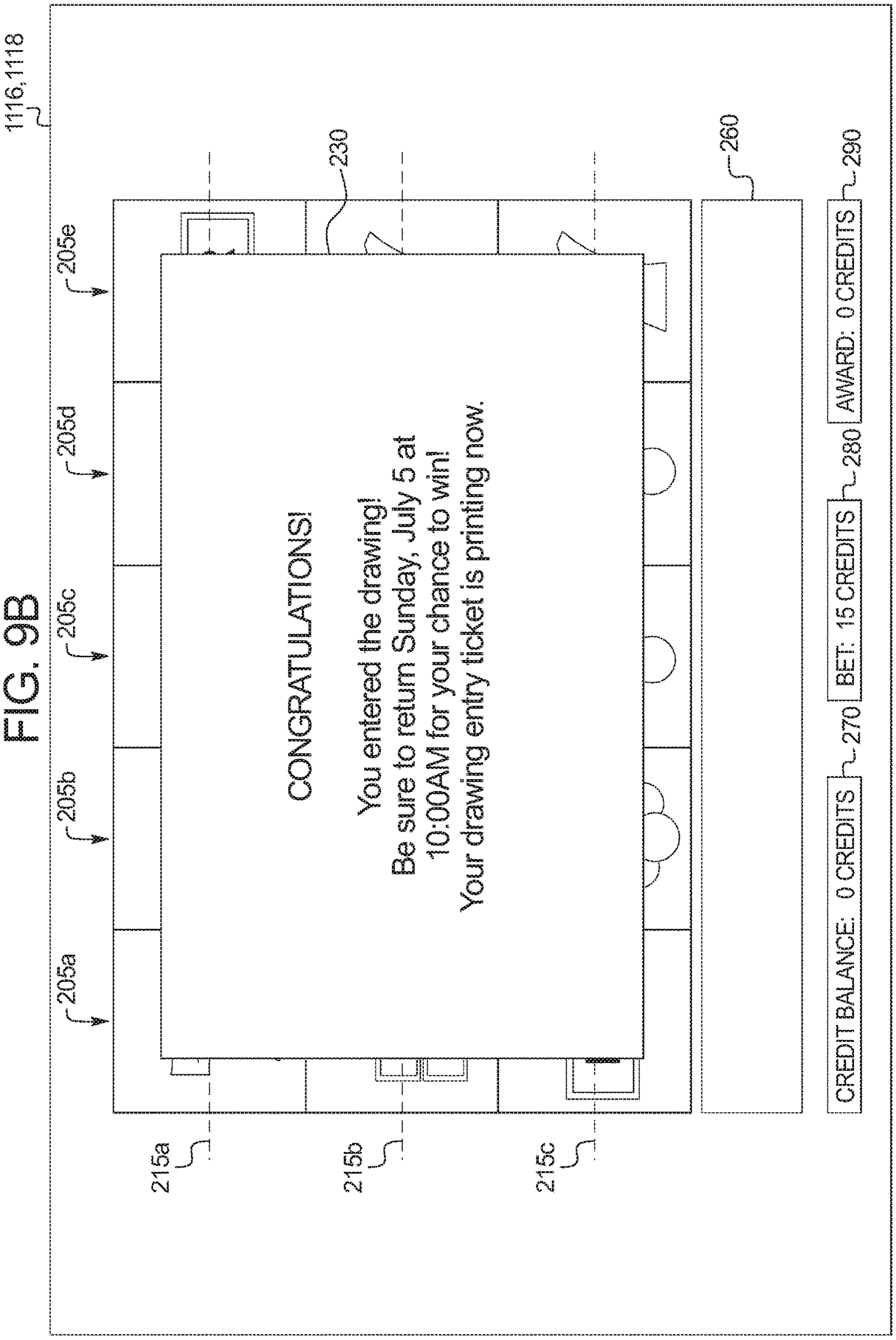

FIGS. 9A and 9B illustrate screen shots of one example embodiment of the gaming system of the present disclosure providing the drawing wager alternative after receiving a selection of the drawing wager alternative. More specifically, as illustrated in FIG. 9A, the gaming system receives a selection of the drawing wager alternative 232*e*. In this example embodiment, the gaming system provides the player with 200 drawing entries (one per every $0.01 remaining in the player's credit balance) and prints a ticket identifying the player's 200 drawing entries. As shown in FIG. 9B, the gaming system displays the following message in pop-up or dialog box 230" "CONGRATULATIONS! YOU ENTERED THE DRAWING! BE SURE TO RETURN SUNDAY, JULY 5 AT 10:00 AM FOR YOUR CHANCE TO WIN! YOUR DRAWING ENTRY TICKET IS PRINTING NOW."

Additional Embodiments

In certain embodiments, the gaming system determines whether the player's credit balance is less than the designated wager amount and greater than or equal to the lowest eligible credit balance after the occurrence of a triggering event. In various embodiments, the triggering event occurs: (a) upon the completion of a play of a wagering game and after the player's credit balance is updated to reflect any awards for that play of the wagering game; (b) when value (such as currency or a redeemable ticket) is deposited into the gaming system; (c) upon an indication that the player wishes to cash out any amount of the player's credit balance; (d) upon an indication that the player wishes to cash out an amount of the player's credit balance within a designated range of amounts; and/or (e) in embodiments in which a ticket is redeemable at a payment kiosk, upon insertion of that ticket into the payment kiosk. In certain embodiments, the triggering event is based on the player's credit balance and not based on any triggering events or conditions associated with any primary wagering games or any secondary or bonus games. That is, in these embodiments the triggering event is separate from, in addition to, distinct from, and independent of any other triggering events or conditions associated with any primary wagering games or any secondary or bonus games.

The designated wager amount is less than or equal to the maximum wager amount. In various embodiments, the lowest eligible credit balance is: (a) an amount greater than zero, or (b) an amount greater than or equal to 1 credit (or the currency equivalent, e.g., $0.25 in a $0.25 denomination gaming system or $1.00 in a $1.00 denomination gaming system). In certain embodiments, the designated wager amount is an amount that can be expressed as an integer number of credits; that is, in such embodiments the designated wager amount is not an amount that can only be expressed as a fractional number of credits. In one embodiment, the designated wager amount is equal to the maximum wager amount. In another embodiment, the designated wager amount is equal to the minimum wager amount. In a further embodiment in which the wagering game is a slot game including a plurality of paylines, the designated wager amount is a cost to cover a play of the slot game. In another embodiment in which the wagering game is a card game including a plurality of hands of cards, the designated wager amount is a wager amount that enables a wager to be placed on each of the hands of cards.

In certain embodiments, an operator of a casino or other venue in which the gaming system is located determines the designated wager amount, while in other embodiments a manufacturer of the gaming system determines the designated wager amount. It should be appreciated that, in various embodiments, the designated wager amount is: (a) predetermined, (b) randomly determined, (c) determined based on a weighted probability table, (d) determined based on a wager by a player, (e) determined based on game play, (f) determined based on time of day, (g) determined based on the day of the week, (h) any suitable combination thereof, or (i) determined in any other suitable manner.

The different player-selectable wager alternatives are different from, separate from, and in addition to any wagers that can be placed on any plays of the wagering game, and are provided regardless of any awards associated with any plays of the wagering game. That is, the different player-selectable wager alternatives concern the player's credit balance rather than any specific award or awards won by the player for a play of the wagering game. It should be appreciated that the quantity of displayed different player-selectable wager alternatives may be: (a) predetermined, (b) randomly determined, (c) determined based on a weighted probability table, (d) determined based on a wager by a player, (e) determined based on game play, (f) any suitable combination thereof, or (g) determined in any suitable manner. It should further be appreciated that which specific different player-selectable wager alternatives are displayed are: (a) predetermined, (b) randomly determined, (c) determined based on a weighted probability table, (d) determined based on a wager by a player, (e) determined based on game play, (f) any suitable combination thereof, or (g) determined in any suitable manner. For example, the quantity of displayed wager alternatives is based on the player's credit balance, and which specific wager alternatives are displayed is based on the denomination of the gaming machine at which the player is playing.

In various embodiments, the amount of the player's credit balance risked, transferred, or exchanged in association with a selected wager alternative is: (a) the player's remaining credit balance, (b) one-half of the player's remaining credit balance, (c) one-third of the player's remaining credit balance, (d) one-fourth of the player's remaining credit balance, (e) all but a designated quantity of the player's remaining credit balance, or (f) any suitable quantity of the player's remaining credit balance. It should be appreciated that the amount risked may be: (a) predetermined, (b) determined by the player, (c) randomly determined, (d) determined based on a weighted probability table, (e) determined based on a wager by the player, (f) determined based on game play, (g) any suitable combination thereof, or (h) determined in any suitable manner.

In certain embodiments, the gaming system enables the player to select a plurality of different player-selectable wager alternatives and risk, transfer, or exchange different portions of the player's credit balance in association with each selected wager alternative. For instance, in one example embodiment in which the player's remaining credit balance is 10 credits, the gaming system enables the player to transfer 5 credits to the player's online casino bankroll by selecting the online casino deposit wager alternative and to exchange the remaining 5 credits for a comp by selecting the comps wager alternative.

In various embodiments, the gaming system provides one or more different player-selectable wager alternatives only if the player satisfies one or more conditions. In certain embodiments, at least one such condition is satisfied when: (a) the player has a player tracking account, (b) the player's player tracking ranking or level is at least a designated ranking or level, (c) a quantity of player tracking points of the player reaches a designated quantity, (d) a length of time of the player at the gaming system reaches a designated length, (e) an amount wagered by the player over a predetermined length of time or quantity of plays reaches a designated amount, (f) a length of time of the player in the casino or other venue in which the gaming system is located reaches a designated length of time, (g) a promotional period is active, (h) a total quantity of plays of wagering games played by the player reaches a designated quantity of plays; (i) a total amount of credits or currency won by the player reaches a designated amount won; (j) a total amount of credits or currency lost by the player reaches a designated amount lost; (k) a time of day reaches a designated time of day; (l) a play of a secondary or bonus game has not been provided within a designated amount of time; (m) a play of a secondary or bonus game has not been provided within a designated quantity of plays of wagering games; (n) the player has achieved a designated quantity of consecutive winning outcomes; (o) one or more designated events have occurred; (p) the player has achieved a designated quantity of consecutive losing outcomes; (q) a total quantity of winning outcomes achieved by the player reaches a designated quantity; (r) a total quantity of losing outcomes achieved by the player reaches a designated quantity; (s) a total quantity of coin-in reaches a designated quantity; (t) a credit balance of the player reaches a designated credit balance; (u) a total amount of currency deposited by the player reaches a designated amount; (v) a ticket, coupon, or promotion is inserted or otherwise entered (such as by typing in a promotion code or scanning a barcode); (w) a designated quantity of credits is transferred onto the gaming system; (x) player tracking points are converted into one or more credits; (y) merchandise is purchased on the gaming system (such as through the use of player tracking points); (z) a contribution is made to charity through the use of the gaming system; (aa) an update is posted onto a social networking website; (bb) a status is changed on a social networking website; (cc) a gaming establishment (such as a casino) is liked or shared via a social networking side; (dd) a specific winning symbol, winning symbol combination, or other outcome is achieved; (ee) a picture is submitted; (ff) an email address is supplied; and (gg) a survey is completed. and/or (hh) any other suitable event or series of events occurs.

In certain embodiments, the gaming system also displays a "play off credit balance" option if the gaming system determines that the player's credit balance is less than the designated wager amount and greater than or equal to the lowest eligible credit balance. In these embodiments, if the player selects the "play off credit balance" option, the gaming system causes the player's remaining credit balance to be wagered on a play of the wagering game, displays the play of the wagering game, and provides any awards associated with the play of the wagering game. In various embodiments, the gaming system also displays the "play off credit balance" option when displaying the wager alternatives. It should be appreciated that in certain embodiments the "play off credit balance option" is in addition to any standard repeat bet button or input of the gaming system.

In various embodiments, if the gaming system determines that the player's credit balance is less than the designated wager amount and greater than or equal to the lowest eligible credit balance, the gaming system enables the player to convert a portion of the player's credit balance (such as the player's entire credit balance) into one or more player tracking points or any other suitable non-monetary currency (such as non-monetary credits used to play at an online casino). Thus, in these embodiments, the player may receive a benefit in exchange for those credits instead of bleeding off a small remaining credit balance on what appear to be "wasted" plays of the wagering game or cashing out that small remaining credit balance.

In certain embodiments, if the gaming system determines that the player's credit balance is less than the designated wager amount and greater than or equal to the lowest eligible credit balance, the gaming system enables the player to convert player tracking points (which have previously been provided to the player) into a quantity of credits such that, when added to the player's credit balance, the quantity of credits causes the player's credit balance to at least equal the designated wager amount. For example, the designated wager amount is 100 credits for one embodiment of a gaming system of the present disclosure. In this example, the player has a credit balance of 95 credits. The gaming system enables the player to convert a certain number of the player's player tracking points into 5 credits which, when added to the player's credit balance, increase the player's credit balance to 100 credits to equal the designated wager amount. This enables a player to continue playing the wagering game at the designated wager amount without depositing additional value into the gaming system and enables the player to continue playing at the designated wager amount.

It is intended that the features of the various embodiments disclosed herein may be combined without departing from the scope of the subject matter presented.

It should be appreciated that:

(a) the quantity of reels;

(b) the quantity of symbol display areas;

(c) the symbols associated with the reels;

(d) the winning symbol combinations included in the paytable;

(e) the award associated with each winning symbol combination;

(f) the quantity of symbol display areas with which each reel is associated;

(g) the specific symbol display areas with which each reel is associated;

(h) the specific symbol display areas with which each payline is associated;

(i) the quantity of winning symbol combinations;

(j) the quantity and definition of paylines;

(k) the quantity of different denominations from which the player may select the player's desired denomination;

(l) the designated wager amount;

(m) the lowest eligible credit balance;

(o) the triggering event upon which the gaming system determines if the player's credit balance is less than the designated wager amount and greater than or equal to the lowest eligible credit balance;

(p) how many different player-selectable wager alternatives are offered;

(q) the specific different player-selectable wager alternatives offered;

(r) the alternative award associated with the bonus or alternative game of the bonus wager alternative;

(s) the quantity of bonus or alternative games of the bonus wager alternative;

(t) which particular types of bonus or alternative games are provided via the bonus wager alternative;

(u) the portion of the player's credit balance risked, transferred, or exchanged in association with a selected wager alternative;

(v) how many wager alternative the gaming system enables the player to select;

(w) the probability of providing an alternative award associated with a bonus or alternative game of the bonus wager alternative; and/or (x) any other variables or determinations described herein may be: (1) predetermined; (2) randomly determined; (3) randomly determined based on one or more weighted percentages; (4) determined based on a generated symbol or symbol combination; (5) determined independent of a generated symbol or symbol combination; (6) determined based on a random determination by a central controller (described below); (7) determined independent of a random determination by the central controller; (8) determined based on a random determination at an electronic gaming machine (EGM) configured to operate the slot game (described below); (9) determined independent of a random determination at the EGM; (10) determined based on at least one play of at least one game; (11) determined independent of at least one play of at least one game; (12) determined based on a player's selection; (13) determined independent of a player's selection; (14) determined based on one or more side wagers placed; (15) determined independent of one or more side wagers placed; (16) determined based on the player's primary game wager or wager level; (17) determined independent of the player's primary game wager or wager level; (18) determined based on time (such as the time of day); (19) determined independent of time (such as the time of day); (20) determined based on an amount of coin-in accumulated in one or more pools; (21) determined independent of an amount of coin-in accumulated in one or more pools; (22) determined based on a status of the player (i.e., a player tracking status); (23) determined independent of a status of the player (i.e., a player tracking status); (24) determined based on one or more other determinations disclosed herein; (25) determined independent of any other determination disclosed herein; and/or (26) determined in any other suitable manner or based on or independent of any other suitable factor(s).

Gaming Systems

It should be appreciated that the above-described embodiments of the present disclosure may be implemented in accordance with or in conjunction with one or more of a variety of different types of gaming systems, such as, but not limited to, those described below.

The present disclosure contemplates a variety of different gaming systems each having one or more of a plurality of different features, attributes, or characteristics. It should be appreciated that a "gaming system" as used herein refers to various configurations of: (a) one or more central servers, central controllers, or remote hosts; (b) one or more EGMs; and/or (c) one or more personal gaming devices, such as desktop computers, laptop computers, tablet computers or computing devices, personal digital assistants (PDAs), mobile telephones such as smart phones, and other mobile computing devices.

Thus, in various embodiments, the gaming system of the present disclosure includes: (a) one or more EGMs in combination with one or more central servers, central controllers, or remote hosts; (b) one or more personal gaming devices in combination with one or more central servers, central controllers, or remote hosts; (c) one or more personal gaming devices in combination with one or more EGMs; (d) one or more personal gaming devices, one or more EGMs, and one or more central servers, central controllers, or remote hosts in combination with one another; (e) a single EGM; (f) a plurality of EGMs in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity, each EGM and each personal gaming device of the present disclosure is collectively referred to herein as an "EGM." Additionally, for brevity and clarity, unless specifically stated otherwise, "EGM" as used herein represents one EGM or a plurality of EGMs, and "central server, central controller, or remote host" as used herein represents one central server, central controller, or remote host or a plurality of central servers, central controllers, or remote hosts.

Figure 10A:
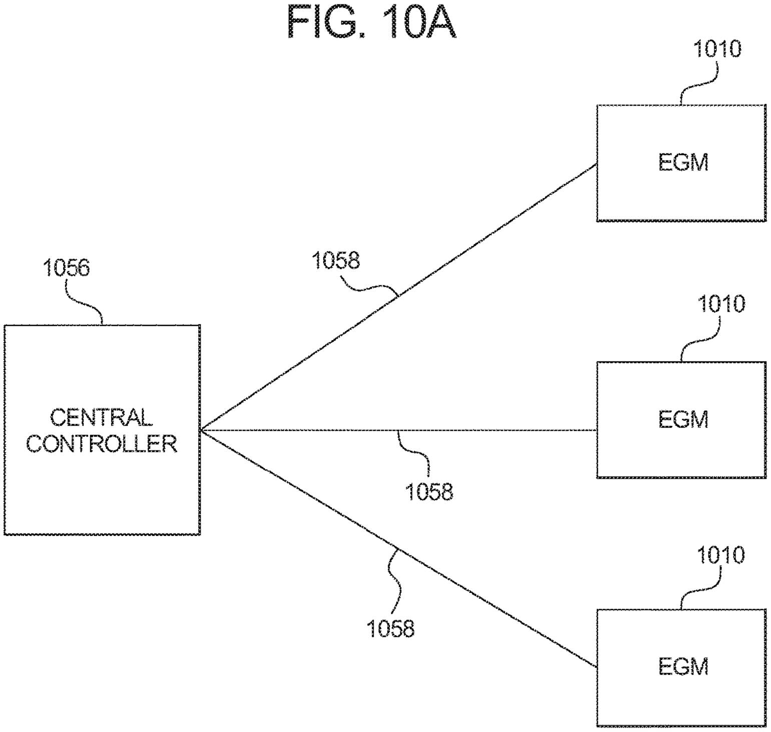
FIG. 10A is a schematic block diagram of one embodiment of a network configuration of the gaming system of the present disclosure.

As noted above, in various embodiments, the gaming system includes an EGM in combination with a central server, central controller, or remote host. In such embodiments, the EGM is configured to communicate with the central server, central controller, or remote host through a data network or remote communication link. In certain such embodiments, the EGM is configured to communicate with another EGM through the same data network or remote communication link or through a different data network or remote communication link. For example, the gaming system illustrated in FIG. 10A includes a plurality of EGMs 1010 that are each configured to communicate with a central server, central controller, or remote host 1056 through a data network 1058.

In certain embodiments in which the gaming system includes an EGM in combination with a central server, central controller, or remote host, the central server, central controller, or remote host is any suitable computing device (such as a server) that includes at least one processor and at least one memory device or storage device. As further described below, the EGM includes at least one EGM processor configured to transmit and receive data or signals representing events, messages, commands, or any other suitable information between the EGM and the central server, central controller, or remote host. The at least one processor of that EGM is configured to execute the events, messages, or commands represented by such data or signals in conjunction with the operation of the EGM. Moreover, the at least one processor of the central server, central controller, or remote host is configured to transmit and receive data or signals representing events, messages, commands, or any other suitable information between the central server, central controller, or remote host and the EGM. The at least one processor of the central server, central controller, or remote host is configured to execute the events, messages, or commands represented by such data or signals in conjunction with the operation of the central server, central controller, or remote host. It should be appreciated that one, more, or each of the functions of the central server, central controller, or remote host may be performed by the at least one processor of the EGM. It should be further appreciated that one, more, or each of the functions of the at least one processor of the EGM may be performed by the at least one processor of the central server, central controller, or remote host.

In certain such embodiments, computerized instructions for controlling any games (such as any primary or base games and/or any secondary or bonus games) displayed by the EGM are executed by the central server, central controller, or remote host. In such "thin client" embodiments, the central server, central controller, or remote host remotely controls any games (or other suitable interfaces) displayed by the EGM, and the EGM is utilized to display such games (or suitable interfaces) and to receive one or more inputs or commands. In other such embodiments, computerized instructions for controlling any games displayed by the EGM are communicated from the central server, central controller, or remote host to the EGM and are stored in at least one memory device of the EGM. In such "thick client" embodiments, the at least one processor of the EGM executes the computerized instructions to control any games (or other suitable interfaces) displayed by the EGM.

In various embodiments in which the gaming system includes a plurality of EGMs, one or more of the EGMs are thin client EGMs and one or more of the EGMs are thick client EGMs. In other embodiments in which the gaming system includes one or more EGMs, certain functions of one or more of the EGMs are implemented in a thin client environment, and certain other functions of one or more of the EGMs are implemented in a thick client environment. In one such embodiment in which the gaming system includes an EGM and a central server, central controller, or remote host, computerized instructions for controlling any primary or base games displayed by the EGM are communicated from the central server, central controller, or remote host to the EGM in a thick client configuration, and computerized instructions for controlling any secondary or bonus games or other functions displayed by the EGM are executed by the central server, central controller, or remote host in a thin client configuration.

In certain embodiments in which the gaming system includes: (a) an EGM configured to communicate with a central server, central controller, or remote host through a data network; and/or (b) a plurality of EGMs configured to communicate with one another through a data network, the data network is a local area network (LAN) in which the EGMs are located substantially proximate to one another and/or the central server, central controller, or remote host. In one example, the EGMs and the central server, central controller, or remote host are located in a gaming establishment or a portion of a gaming establishment.

In other embodiments in which the gaming system includes: (a) an EGM configured to communicate with a central server, central controller, or remote host through a data network; and/or (b) a plurality of EGMs configured to communicate with one another through a data network, the data network is a wide area network (WAN) in which one or more of the EGMs are not necessarily located substantially proximate to another one of the EGMs and/or the central server, central controller, or remote host. For example, one or more of the EGMs are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs are located. It should be appreciated that in certain embodiments in which the data network is a WAN, the gaming system includes a central server, central controller, or remote host and an EGM each located in a different gaming establishment in a same geographic area, such as a same city or a same state. It should be appreciated that gaming systems in which the data network is a WAN are substantially identical to gaming systems in which the data network is a LAN, though the quantity of EGMs in such gaming systems may vary relative to one another.

In further embodiments in which the gaming system includes: (a) an EGM configured to communicate with a central server, central controller, or remote host through a data network; and/or (b) a plurality of EGMs configured to communicate with one another through a data network, the data network is an internet or an intranet. In certain such embodiments, an internet browser of the EGM is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the internet browser of the EGM.

It should be appreciated that the central server, central controller, or remote host and the EGM are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of EGMs to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

EGM Components

Figure 10B:
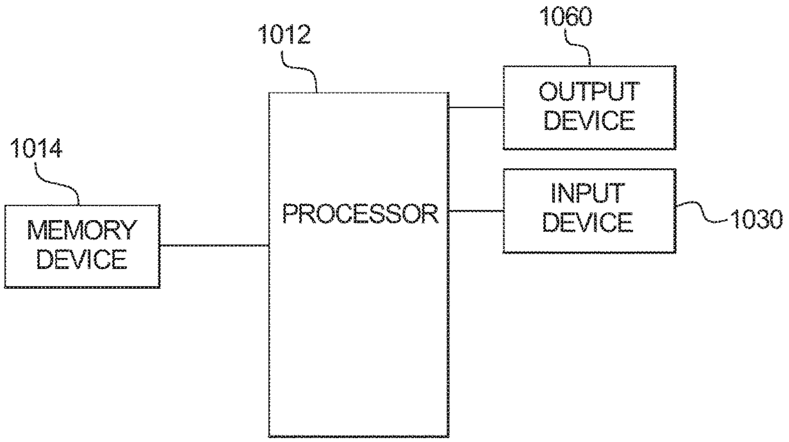
FIG. 10B is a schematic block diagram of an example electronic configuration of the gaming system of the present disclosure.

In various embodiments, an EGM includes at least one processor configured to operate with at least one memory device, at least one input device, and at least one output device. The at least one processor may be any suitable processing device or set of processing devices, such as a microprocessor, a microcontroller-based platform, a suitable integrated circuit, or one or more application-specific integrated circuits (ASICs). FIG. 10B illustrates an example EGM including a processor 1012.

As generally noted above, the at least one processor of the EGM is configured to communicate with, configured to access, and configured to exchange signals with at least one memory device or data storage device. In various embodiments, the at least one memory device of the EGM includes random access memory (RAM), which can include non-volatile RAM (NVRAM), magnetic RAM (MRAM), ferroelectric RAM (FeRAM), and other forms as commonly understood in the gaming industry. In other embodiments, the at least one memory device includes read only memory (ROM). In certain embodiments, the at least one memory device of the EGM includes flash memory and/or EEPROM (electrically erasable programmable read only memory). The example EGM illustrated in FIG. 10B includes a memory device 1014. It should be appreciated that any other suitable magnetic, optical, and/or semiconductor memory may operate in conjunction with the EGM disclosed herein. In certain embodiments, the at least one processor of the EGM and the at least one memory device of the EGM both reside within a cabinet of the EGM (as described below). In other embodiments, at least one of the at least one processor of the EGM and the at least one memory device of the EGM reside outside the cabinet of the EGM (as described below).

In certain embodiments, as generally described above, the at least one memory device of the EGM stores program code and instructions executable by the at least one processor of the EGM to control the EGM. The at least one memory device of the EGM also stores other operating data, such as image data, event data, input data, random number generators (RNGs) or pseudo-RNGs, paytable data or information, and/or applicable game rules that relate to the play of one or more games on the EGM (such as primary or base games and/or secondary or bonus games as described below). In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an Internet or intranet).

Figure 11A:
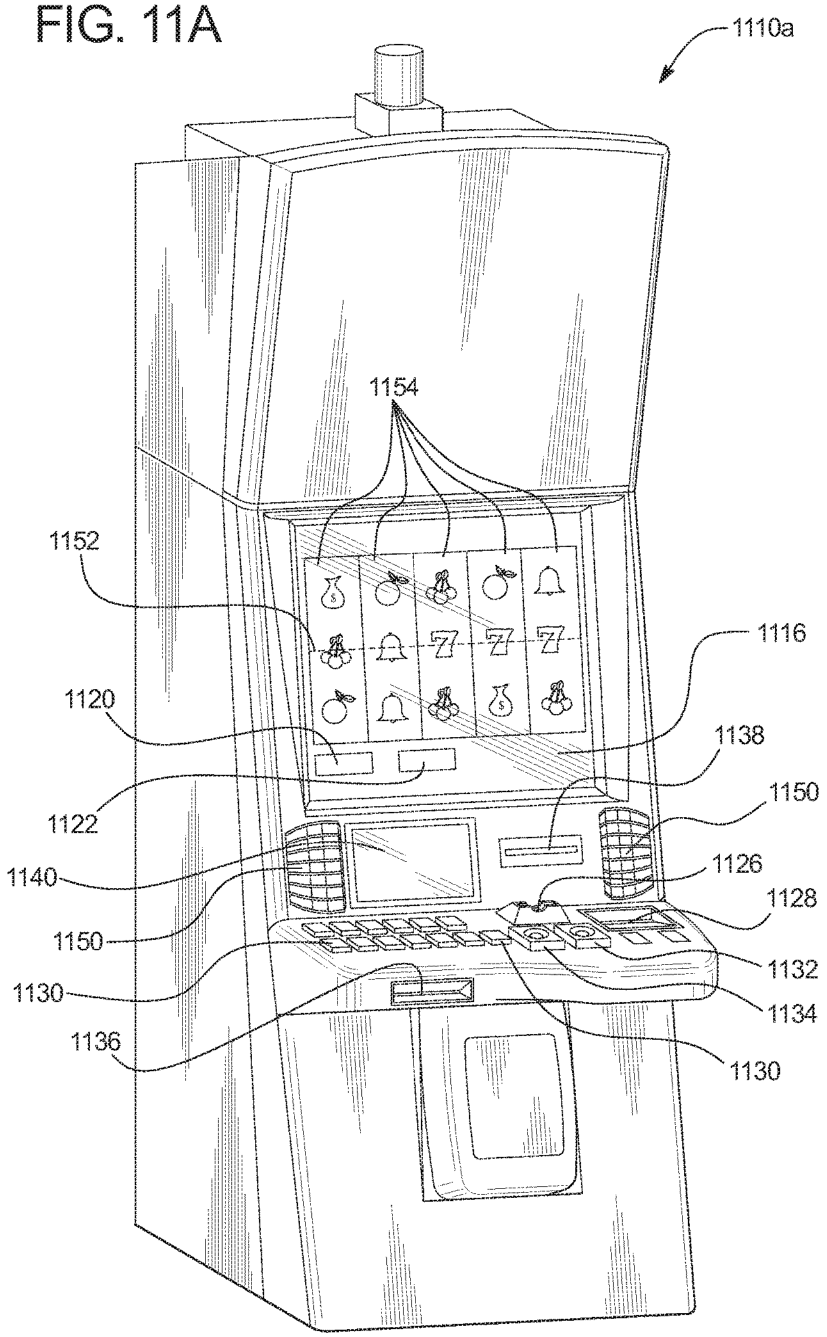
FIGS. 11A and 11B are perspective views of example alternative embodiments of the gaming system of the present disclosure.
Figure 11B:
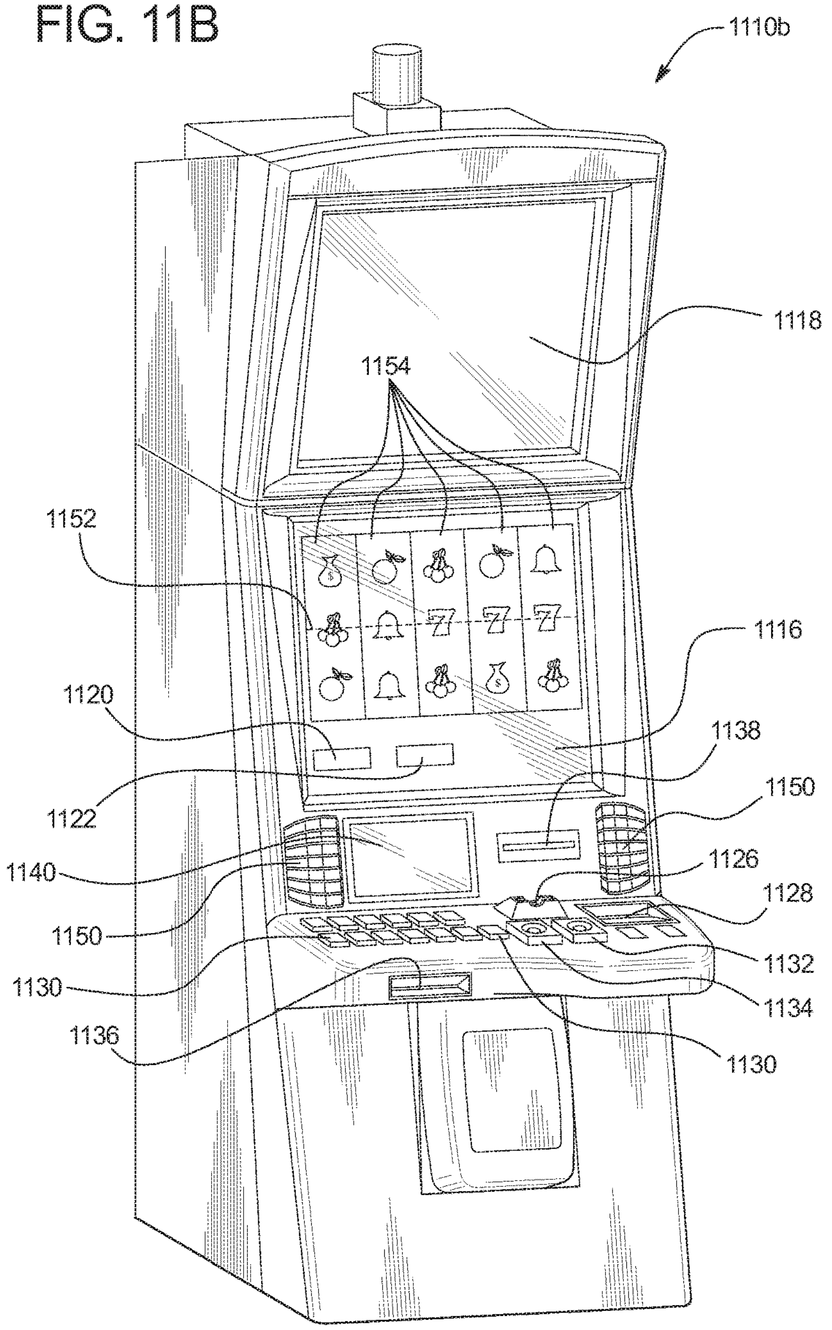

In various embodiments, the EGM includes one or more input devices. The input devices may include any suitable device that enables an input signal to be produced and received by the at least one processor of the EGM. The example EGM illustrated in FIG. 10B includes at least one input device 1030. One input device of the EGM is a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. FIGS. 11A and 11B illustrate example EGMs that each include the following payment devices: (a) a combined bill and ticket acceptor 1128, and (b) a coin slot 1126.

In one embodiment, the EGM includes a payment device configured to enable the EGM to be funded via an electronic funds transfer, such as a transfer of funds from a bank account. In another embodiment, the EGM includes a payment device configured to communicate with a mobile device of a player, such as a cell phone, a radio frequency identification tag, or any other suitable wired or wireless device, to retrieve relevant information associated with that player to fund the EGM. It should be appreciated that when the EGM is funded, the at least one processor determines the amount of funds entered and displays the corresponding amount on a credit display or any other suitable display as described below.

In various embodiments, one or more input devices of the EGM are one or more game play activation devices that are each used to initiate a play of a game on the EGM or a sequence of events associated with the EGM following appropriate funding of the EGM. The example EGMs illustrated in FIGS. 11A and 11B each include a game play activation device in the form of a game play initiation button 32. It should be appreciated that, in other embodiments, the EGM begins game play automatically upon appropriate funding rather than upon utilization of the game play activation device.

In certain embodiments, one or more input devices of the EGM are one or more wagering or betting devices. One such wagering or betting device is as a maximum wagering or betting device that, when utilized, causes a maximum wager to be placed. Another such wagering or betting device is a repeat the bet device that, when utilized, causes the previously-placed wager to be placed. A further such wagering or betting device is a bet one device. A bet is placed upon utilization of the bet one device. The bet is increased by one credit each time the bet one device is utilized. Upon the utilization of the bet one device, a quantity of credits shown in a credit display (as described below) decreases by one, and a number of credits shown in a bet display (as described below) increases by one.

In other embodiments, one input device of the EGM is a cash out device. The cash out device is utilized to receive a cash payment or any other suitable form of payment corresponding to a quantity of remaining credits of a credit display (as described below). The example EGMs illustrated in FIGS. 11A and 11B each include a cash out device in the form of a cash out button 1134.

In certain embodiments, one input device of the EGM is a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In various embodiments, one input device of the EGM is a sensor, such as a camera, in communication with the at least one processor of the EGM (and controlled by the at least one processor of the EGM in some embodiments) and configured to acquire an image or a video of a player using the EGM and/or an image or a video of an area surrounding the EGM.

In embodiments including a player tracking system, as further described below, one input device of the EGM is a card reader in communication with the at least one processor of the EGM. The example EGMs illustrated in FIGS. 11A and 11B each include a card reader 1138. The card reader is configured to read a player identification card inserted into the card reader.

In various embodiments, the EGM includes one or more output devices. The example EGM illustrated in FIG. 10B includes at least one output device 1060. One or more output devices of the EGM are one or more display devices configured to display any game(s) displayed by the EGM and any suitable information associated with such game(s). In certain embodiments, the display devices are connected to or mounted on a cabinet of the EGM (as described below). In various embodiments, the display devices serves as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM illustrated in FIG. 11A includes a central display device 1116, a player tracking display 1140, a credit display 1120, and a bet display 1122. The example EGM illustrated in FIG. 11B includes a central display device 1116, an upper display device 1118, a player tracking display 1140, a player tracking display 1140, a credit display 1120, and a bet display 1122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. It should be appreciated that the display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, one output device of the EGM is a payout device. In these embodiments, when the cash out device is utilized as described above, the payout device causes a payout to be provided to the player. In one embodiment, the payout device is one or more of: (a) a ticket generator configured to generate and provide a ticket or credit slip representing a payout, wherein the ticket or credit slip may be redeemed via a cashier, a kiosk, or other suitable redemption system; (b) a note generator configured to provide paper currency; (c) a coin generator configured to provide coins or tokens in a coin payout tray; and (d) any suitable combination thereof. The example EGMs illustrated in FIGS. 11A and 11B each include ticket generator 1136. In one embodiment, the EGM includes a payout device configured to fund an electronically recordable identification card or smart card or a bank account via an electronic funds transfer.

In certain embodiments, one output device of the EGM is a sound generating device controlled by one or more sound cards. In one such embodiment, the sound generating device includes one or more speakers or other sound generating hardware and/or software for generating sounds, such as by playing music for any games or by playing music for other modes of the EGM, such as an attract mode. The example EGMs illustrated in FIGS. 11A and 11B each include a plurality of speakers 1150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices. At least U.S. Patent Application Publication No. 2004/0254014 describes a variety of EGMs including one or more communication ports that enable the EGMs to communicate and operate with one or more external peripherals.

As generally described above, in certain embodiments, such as the example EGMs illustrated in FIGS. 11A and 11B, the EGM has a support structure, housing, or cabinet that provides support for a plurality of the input device and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs shown in FIGS. 11A and 11B, EGMs may have varying cabinet and display configurations.

It should be appreciated that, in certain embodiments, the EGM is a device that has obtained approval from a regulatory gaming commission, and in other embodiments, the EGM is a device that has not obtained approval from a regulatory gaming commission.

As explained above, for brevity and clarity, both the EGMs and the personal gaming devices of the present disclosure are collectively referred to herein as "EGMs." Accordingly, it should be appreciated that certain of the example EGMs described above include certain elements that may not be included in all EGMs. For example, the payment device of a personal gaming device such as a mobile telephone may not include a coin acceptor, while in certain instances the payment device of an EGM located in a gaming establishment may include a coin acceptor.

Operation of Primary or Base Games and/or Secondary or Bonus Games

In various embodiments, an EGM may be implemented in one of a variety of different configurations. In various embodiments, the EGM may be implemented as one of: (a) a dedicated EGM wherein computerized game programs executable by the EGM for controlling any primary or base games (referred to herein as "primary games") and/or any secondary or bonus games or other functions (referred to herein as "secondary games") displayed by the EGM are provided with the EGM prior to delivery to a gaming establishment or prior to being provided to a player; and (b) a changeable EGM wherein computerized game programs executable by the EGM for controlling any primary games and/or secondary games displayed by the EGM are downloadable to the EGM through a data network or remote communication link after the EGM is physically located in a gaming establishment or after the EGM is provided to a player.

As generally explained above, in various embodiments in which the gaming system includes a central server, central controller, or remote host and a changeable EGM, the at least one memory device of the central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award. At least U.S. Pat. Nos. 7,470,183; 7,563,163; and 7,833,092 and U.S. Patent Application Publication Nos. 2005/0148382, 2006/0094509, and 2009/0181743 describe various examples of this type of award determination.

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards. At least U.S. Pat. Nos. 7,753,774; 7,731,581; 7,955,170; and 8,070,579 and U.S. Patent Application Publication No. 2011/0028201 describe various examples of this type of award determination.

In certain embodiments in which the gaming system includes a central server, central controller, or remote host and an EGM, the EGM is configured to communicate with the central server, central controller, or remote host for monitoring purposes only. In such embodiments, the EGM determines the game outcome(s) and/or award(s) to be provided in any of the manners described above, and the central server, central controller, or remote host monitors the activities and events occurring on the EGM. In one such embodiment, the gaming system includes a real-time or online accounting and gaming information system configured to communicate with the central server, central controller, or remote host. In this embodiment, the accounting and gaming information system includes: (a) a player database for storing player profiles, (b) a player tracking module for tracking players (as described below), and (c) a credit system for providing automated transactions. At least U.S. Pat. No. 6,913,534 and U.S. Patent Application Publication No. 2006/0281541 describe various examples of such accounting systems.

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. The example EGM shown in FIG. 11B includes a payline 1152 and a plurality of reels 1154. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display areas on a requisite number of adjacent reels. In one such embodiment, one or more paylines are formed between at least two symbol display areas that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display areas, the gaming system enables a wager to be placed on a plurality of symbol display areas, which activates those symbol display areas.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display areas on the requisite number of adjacent reels (i.e., not on paylines passing through any displayed winning symbol combinations). If a winning symbol combination is generated on the reels, one award for that occurrence of the generated winning symbol combination is provided. At least U.S. Pat. No. 8,012,011 and U.S. Patent Application Publication Nos. 2008/0108408 and 2008/0132320 describe various examples of ways to win award determinations.

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award. At least U.S. Pat. Nos. 5,766,079; 7,585,223; 7,651,392; 7,666,093; 7,780,523; and 7,905,778 and U.S. Patent Application Publication Nos. 2008/0020846, 2009/0123364, 2009/0123363, and 2010/0227677 describe various examples of different progressive gaming systems.

As generally noted above, in addition to providing winning credits or other awards for one or more plays of the primary game(s), in various embodiments the gaming system provides credits or other awards for one or more plays of one or more secondary games. The secondary game typically enables an award to be obtained addition to any award obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game(s). It should be appreciated that the secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. It should be appreciated that any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for the providing of the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards. At least U.S. Patent Application Publication Nos. 2007/0123341, 2008/0070680, 2008/0176650, and 2009/0124363 describe various examples of different group gaming systems.

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a cell phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device. At least U.S. Pat. Nos. 6,722,985; 6,908,387; 7,311,605; 7,611,411; 7,617,151; and 8,057,298 describe various examples of player tracking systems.

It should be understood that various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method of operating a gaming system, the method comprising:

(a) receiving, by an acceptor of the gaming system, a physical item associated with a monetary value;

(b) establishing, by at least one processor, a credit balance based at least in part on the monetary value associated with the received physical item;

(c) receiving an actuation of a wager button;

(d) placing, by the at least one processor, a wager on a play of a wagering game in response to the actuation of the wager button, the credit balance decreasable by the wager;

(e) displaying, by at least one display device, the play of the wagering game;

(f) determining, by the at least one processor, whether the credit balance after the play of the wagering game is nonzero and less than a designated wager amount;

(g) if the credit balance is nonzero and less than the designated wager amount:

(1) enabling selection of a drawing wager alternative that is separate from any wagers that can be made on any plays of the wagering game; and (2) if a selection of the drawing wager alternative is received, providing at least one drawing entry in exchange for at least part of the credit balance and reducing, by the at least one processor, the credit balance by the part of the credit balance exchanged for the at least one drawing entry;

(h) receiving an actuation of a cashout button; and (i) initiating, by the at least one processor, a payout associated with the credit balance in response to the actuation of the cashout button if the credit balance is nonzero.

2. The method of claim 1, wherein a quantity of provided drawing entries increases as the part of the credit balance increases.

3. The method of claim 1, which includes allocating, by the at least one processor, at least a portion of the part of the credit balance exchanged for the at least one drawing entry into an award pool.

4. The method of claim 3, wherein the award pool funds at least one award associated with the drawing.

5. The method of claim 1, wherein a monetary unit is exchangeable for a drawing entry.

6. The method of claim 5, wherein the monetary unit is a designated quantity of one or more credits.

7. The method of claim 1, wherein providing the at least one drawing entry includes printing, by a ticket printer of the gaming system, a ticket representing the at least one drawing entry.

8. The method of claim 1, which includes, if the credit balance is nonzero and less than the designated wager amount:

(1) displaying, by the at least one display device, a plurality of different wager alternatives including the drawing wager alternative, wherein each of the plurality of different wager alternatives are different from any wagers that can be made on any plays of the wagering game and may result in a reduction of the credit balance;

(2) enabling selection of one of the plurality of different wager alternatives; and (3) if a selection of one of the wager alternatives is received, providing the selected wager alternative.

9. The method of claim 8, wherein one of the plurality of different wager alternatives is an online deposit wager alternative, and providing the online deposit wager alternative includes transferring, by the at least one processor, the part of the credit balance to an online casino account.

10. The method of claim 1, which is at least partially provided through a data network.

11. The method of claim 10, wherein the data network is an internet.

12. A gaming system comprising:

a housing;

at least one display device supported by the housing;

an acceptor supported by the housing;

at least one input device supported by the housing;

at least one processor; and at least one memory device that stores a plurality of instructions that, when executed by the at least one processor, cause the at least one processor to:

(a) establish a credit balance based at least in part on a monetary value associated with a physical item following receipt of the physical item by the acceptor;

(b) place a wager on a play of a wagering game following receipt of an actuation of a wager button of the at least one input device, the credit balance decreasable by the wager;

(c) display, by the at least one display device, the play of the wagering game;

(d) determine whether the credit balance after the play of the wagering game is nonzero and less than a designated wager amount;

(e) if the credit balance is nonzero and less than the designated wager amount:

(1) enable selection of a drawing wager alternative that is separate from any wagers that can be made on any plays of the wagering game; and (2) if a selection of the drawing wager alternative is received, provide at least one drawing entry in exchange for at least part of the credit balance and reducing, by the at least one processor, the credit balance by the part of the credit balance exchanged for the at least one drawing entry; and (f) initiate a payout associated with the credit balance following receipt of an actuation of the cashout button if the credit balance is nonzero.

13. The gaming system of claim 12, wherein a quantity of provided drawing entries increases as the exchanged part of the credit balance increases.

14. The gaming system of claim 12, wherein the plurality of instructions, when executed by the at least one processor, cause the at least one processor to allocate at least a portion of the part of the credit balance exchanged for the at least one drawing entry into an award pool.

15. The gaming system of claim 14, wherein the award pool funds at least one award associated with the drawing.

16. The gaming system of claim 12, wherein a monetary unit is exchangeable for a drawing entry.

17. The gaming system of claim 16, wherein the monetary unit is a designated quantity of one or more credits.

18. The gaming system of claim 12, which includes a ticket printer supported by the housing, and wherein the plurality of instructions, when executed by the at least one processor, cause the at least one processor to operate with the ticket printer to provide the at least one drawing entry by printing a ticket representing the at least one drawing entry.

19. The gaming system of claim 12, wherein the plurality of instructions, when executed by the at least one processor, cause the at least one processor to, if the credit balance is nonzero and less than the designated wager amount:

(1) display, by the at least one display device, a plurality of different wager alternatives including the drawing wager alternative, wherein each of the plurality of different wager alternatives are different from any wagers that can be made on any plays of the wagering game and may result in a reduction of the credit balance;

(2) enable, by the at least one input device, selection of one of the plurality of different wager alternatives; and (3) if a selection of one of the wager alternatives is received, provide the selected wager alternative.

20. The gaming system of claim 19, wherein one of the plurality of different wager alternatives is an online deposit wager alternative, and wherein the plurality of instructions, when executed by the at least one processor, cause the at least one processor to provide the online deposit wager alternative by transferring the part of the credit balance to an online casino account.

21. A gaming system comprising:

a processor; and a memory device which stores a plurality of instructions, which when executed by the processor, cause the processor to:

(a) enable establishment of a credit balance;

(b) place a wager on a play of a wagering game following receipt of an actuation of a wager button, the credit balance decreasable by the wager;

(c) communicate data which results in a display device of a mobile device displaying the play of the wagering game;

(d) determine whether the credit balance after the play of the wagering game is nonzero and less than a designated wager amount;

(e) if the credit balance is nonzero and less than the designated wager amount:

(1) enable selection of a drawing wager alternative that is separate from any wagers that can be made on any plays of the wagering game; and (2) if a selection of the drawing wager alternative is received, provide at least one drawing entry in exchange for at least part of the credit balance and reducing the credit balance by the part of the credit balance exchanged for the at least one drawing entry; and (f) initiate a payout associated with the credit balance following receipt of an actuation of the cashout button if the credit balance is nonzero.

22. The gaming system of claim 21, wherein a quantity of provided drawing entries increases as the exchanged part of the credit balance increases.

23. The gaming system of claim 21, wherein the plurality of instructions, when executed by the processor, cause the processor to allocate at least a portion of the part of the credit balance exchanged for the at least one drawing entry into an award pool.

24. The gaming system of claim 23, wherein the award pool funds at least one award associated with the drawing.

25. The gaming system of claim 21, wherein a monetary unit is exchangeable for a drawing entry.

26. The gaming system of claim 25, wherein the monetary unit is a designated quantity of one or more credits.

27. The gaming system of claim 21, wherein the plurality of instructions, when executed by the processor, cause the processor to, if the credit balance is nonzero and less than the designated wager amount:

(1) communicate additional data which results in the display device of the mobile device displaying a plurality of different wager alternatives including the drawing wager alternative, wherein each of the plurality of different wager alternatives are different from any wagers that can be made on any plays of the wagering game and may result in a reduction of the credit balance;

(2) enable selection of one of the plurality of different wager alternatives; and (3) if a selection of one of the wager alternatives is received, provide the selected wager alternative.

28. The gaming system of claim 27, wherein one of the plurality of different wager alternatives is an online deposit wager alternative, and wherein the plurality of instructions, when executed by the processor, cause the processor to provide the online deposit wager alternative by transferring the part of the credit balance to an online casino account.

29. The gaming system of claim 21, wherein when executed by the processor, the plurality of instructions cause the processor to communicate with the mobile device via a wireless network.

* * * * *